(12) United States Patent
Fukunaga et al.

(10) Patent No.: US 9,174,478 B2
(45) Date of Patent: Nov. 3, 2015

(54) THERMAL TRANSFER RECORDING MEDIUM

(75) Inventors: Godai Fukunaga, Tokyo (JP); Makiko Nitanai, Tokyo (JP); Yasuo Sugishita, Tokyo (JP); Junichi Arai, Tokyo (JP); Yoko Hirai, Tokyo (JP); Emi Ando, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 65 days.

(21) Appl. No.: 14/345,509

(22) PCT Filed: Sep. 14, 2012

(86) PCT No.: PCT/JP2012/005925
§ 371 (c)(1),
(2), (4) Date: Mar. 18, 2014

(87) PCT Pub. No.: WO2013/042347
PCT Pub. Date: Mar. 28, 2013

(65) Prior Publication Data
US 2014/0356556 A1 Dec. 4, 2014

(30) Foreign Application Priority Data

| | | |
|---|---|---|
| Sep. 22, 2011 | (JP) | 2011-207970 |
| Sep. 27, 2011 | (JP) | 2011-211059 |
| Sep. 27, 2011 | (JP) | 2011-211061 |
| Sep. 27, 2011 | (JP) | 2011-211420 |
| Nov. 30, 2011 | (JP) | 2011-263013 |

(51) Int. Cl.
*B41M 5/385* (2006.01)
*B41M 5/44* (2006.01)
(Continued)

(52) U.S. Cl.
CPC ............ *B41M 5/46* (2013.01); *B32B 27/08* (2013.01); *B32B 27/20* (2013.01); *B32B 27/306* (2013.01);
(Continued)

(58) Field of Classification Search
CPC .. B41M 5/3852; B41M 5/44; B41M 2205/02; B41M 2205/04; B41M 2205/30; B41M 2205/34; B41M 2205/36; B41M 2205/38
USPC ........................................ 428/32.64; 503/227
See application file for complete search history.

(56) References Cited

U.S. PATENT DOCUMENTS

| | | |
|---|---|---|
| 5,147,843 A | 9/1992 | Bodem et al. |
| 6,060,427 A | 5/2000 | Mori et al. |

(Continued)

FOREIGN PATENT DOCUMENTS

| | | |
|---|---|---|
| JP | 5-131760 | 5/1993 |
| JP | 2005-231354 | 9/2005 |

(Continued)

OTHER PUBLICATIONS

The State Intellectual Property Office of China, First Notification of Office Action, China Application No. 201280057025.4, Nov. 26, 2014.

*Primary Examiner* — Bruce H Hess
(74) *Attorney, Agent, or Firm* — Hammer & Associates, P.C.

(57) ABSTRACT

There is provided a thermal transfer recording medium capable of obtaining high transfer sensitivity during high-speed printing, that is, decreasing the amount of a dye used in a dye layer; and preventing abnormal transfer during printing even after storage in a high-temperature and high-humidity environment. The thermal transfer recording medium (1) contains: a heat-resistant sliding layer (40) that is formed on one surface of a substrate (10); and an undercoat layer (20) and a dye layer (30) that are sequentially laminated on the other surface of the substrate (10), in which the undercoat layer (20) contains, as major components, a polyvinyl pyrrolidone and a polyvinyl alcohol having a crystallinity degree of 15% or higher, and the dye layer (30) contains an anthraquinone-based thermal transfer dye.

21 Claims, 1 Drawing Sheet

(51) Int. Cl.
  *B41M 5/46* (2006.01)
  *B32B 27/08* (2006.01)
  *B32B 27/20* (2006.01)
  *B32B 27/30* (2006.01)
  *C09D 1/00* (2006.01)

(52) U.S. Cl.
  CPC ............ *B41M 5/3852* (2013.01); *B41M 5/44* (2013.01); *C09D 1/00* (2013.01); *B32B 2255/10* (2013.01); *B32B 2255/26* (2013.01); *B32B 2307/4026* (2013.01); *B41M 2205/02* (2013.01); *B41M 2205/30* (2013.01); *B41M 2205/34* (2013.01); *B41M 2205/36* (2013.01); *B41M 2205/38* (2013.01)

(56) References Cited

U.S. PATENT DOCUMENTS

| | | |
|---|---|---|
| 2008/0069982 A1 | 3/2008 | Odaka et al. |
| 2008/0274310 A1 | 11/2008 | Fukui et al. |
| 2010/0051184 A1 | 3/2010 | Oguma et al. |

FOREIGN PATENT DOCUMENTS

| | | |
|---|---|---|
| JP | 2006/150956 | 6/2006 |
| JP | 2006-248057 | 9/2006 |
| JP | 2006-306017 | 11/2006 |
| JP | 2010-52297 | 3/2010 |
| JP | 2011-073172 | 4/2011 |

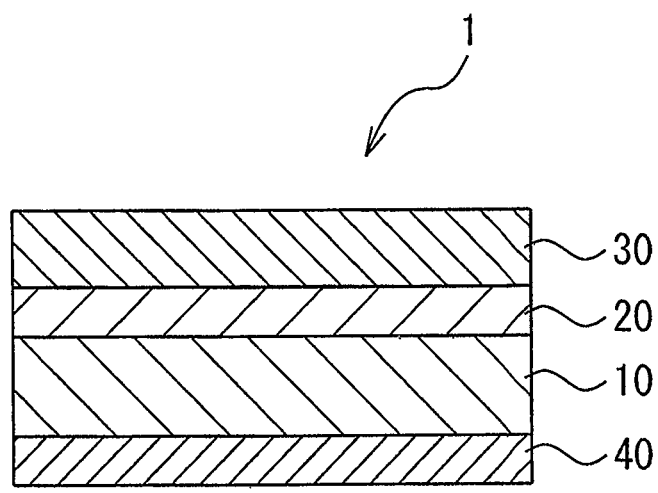

THERMAL TRANSFER RECORDING MEDIUM

TECHNICAL FIELD

The present invention relates to a thermal transfer recording medium which is used in a thermal transfer printer, particularly, to a thermal transfer recording medium including: a heat-resistant sliding layer that is formed on one surface of a substrate; and an undercoat layer and a dye layer that are sequentially laminated on the other side of the substrate.

BACKGROUND ART

Typically, a thermal transfer recording medium is called a thermal ribbon and refers to an ink ribbon used in a thermal transfer printer. In such a thermal transfer recording medium, a thermal transfer layer is formed on one surface of a substrate, and a heat-resistant sliding layer (so-called, "backcoat layer") is formed on the other surface of the substrate. The thermal transfer layer described herein is a layer containing ink, in which this ink is sublimated (sublimation thermal transfer type) or fused (fusion thermal transfer type) by heat generated in a thermal head of a printer to be transferred to a transfer medium side.

Currently, by using the sublimation thermal transfer type among the thermal transfer types in combination with high-performance printers, various full-color images can be simply formed. Therefore, the sublimation thermal transfer type is widely used for self-printing of digital camera photos and for printing cards such as ID cards, printed materials for fun, and the like. Along with such diversification of uses, demands for decrease in size, increase in speed, decrease in cost, and durability of printed materials to be obtained have increased. In addition, recently, a thermal transfer recording medium including, on the same side of a substrate sheet, a protective layer or the like that imparts durability to printed materials and plural thermal transfer layers that are provided so as not to overlap the protective layer or the like has been widely used.

In such circumstances, along with the diversification and the expansion of uses, the printing speed of printers has been further increased. As a result, in a thermal transfer recording medium of the related art, a problem that a sufficient print density is not obtained has occurred. Therefore, in order to increase transfer sensitivity, an attempt to improve transfer sensitivity during printing has been made by decreasing the thickness of a thermal transfer recording medium. However, when the transfer sensitivity is increased, during the manufacturing of a thermal transfer recording medium or printing, wrinkling may occur due to heat, pressure, or the like. In addition, in some cases, a thermal transfer recording medium may be broken.

In addition, an attempt to improve print density and transfer sensitivity during printing has been made by increasing a ratio of dye/resin (Dye/Binder) on a dye layer of a thermal transfer recording medium. However, when the amount of a dye is increased, not only the cost increases, but also a part of the dye may be transferred (set off) to a heat-resistant sliding layer of a thermal transfer recording medium during winding in a manufacturing process. In addition, during rewinding as a subsequent process, the transferred dye may be transferred again (set off again) to another color dye layer or a protective layer. When this contaminated layer is thermally transferred to a transfer medium, a different color from a designated color may be printed, or so-called scumming may occur.

In addition, an attempt to increase energy during image forming not only on a thermal transfer recording medium side but also on a printer side has been made. However, when the energy during image forming is increased, power consumption is increased, and the service life of a thermal head of a printer may be decreased. In addition, fusion bonding between a dye layer and a transfer medium, so-called, abnormal transfer is likely to occur. To deal with this problem, when a large amount of release agent is added to a dye layer or a transfer medium to prevent abnormal transfer, bleeding or scumming may occur on an image.

In order to satisfy the above-described demands, several methods are proposed. For example, PTL 1 proposes a thermal transfer sheet including an adhesive layer between a substrate and a dye layer, the adhesive layer containing a polyvinyl pyrrolidone resin and a modified polyvinyl pyrrolidone resin.

In addition, PTL 2 proposes a thermal transfer sheet including an adhesive layer between a substrate and a dye layer, the adhesive layer containing a thermoplastic resin such as a polyvinyl pyrrolidone resin or a polyvinyl alcohol resin and colloidal inorganic pigment ultrafine particles.

CITATION LIST

Patent Literatures

PTL 1: JP 2005-231354 A
PTL 2: JP 2006-150956 A

SUMMARY OF INVENTION

Technical Problem

However, when printing is performed by a sublimation thermal transfer type high-speed printer using the thermal transfer recording medium disclosed in PTL 1, although abnormal transfer is not observed even after storage in a high-temperature and high-humidity environment, the transfer sensitivity during printing is low and does not reach a sufficient level.

In addition, when printing is performed using the thermal transfer recording medium disclosed in PTL 2 in the same manner, although the transfer sensitivity during printing is high and reaches a sufficient level, abnormal transfer is observed after storage in a high-temperature and high-humidity environment. As described above, a thermal transfer recording medium which can be used in a high-speed printer has not been disclosed, in which the transfer sensitivity during printing is high; and abnormal transfer does not occur even when being stored in a high-temperature and high-humidity environment.

The present invention has been made in order to solve the above-described problems, and an object thereof is to provide a thermal transfer recording medium capable of obtaining high transfer sensitivity during high-speed printing, that is, decreasing the amount of a dye used in a dye layer; and preventing abnormal transfer during printing even after storage in a high-temperature and high-humidity environment.

Solution to Problem

As a result of thorough study for solving the above-described problems, the present inventors found that, when an anthraquinone-based thermal transfer dye is used in a dye layer and a polyvinyl alcohol is used in an undercoat layer, the dye is likely to be transferred to an image-receiving paper side without being diffused and transferred to a substrate side, and thus the transfer sensitivity is increased.

However, although the transfer sensitivity is sufficient, abnormal transfer is not sufficiently suppressed after storage in a high-temperature and high-humidity environment. By adding polyvinyl pyrrolidone or other adhesive resins to a thermal transfer recording medium to improve adhesion, abnormal transfer can be suppressed. However, the transfer sensitivity is decreased.

As a result of additional studies, it was found that, by using a polyvinyl alcohol having a crystallinity degree of 15% or higher, the transfer sensitivity is increased as compared to a polyvinyl alcohol having a crystallinity degree of lower than 15%. Further, it was found that, even after storage in a high-temperature and high-humidity environment, abnormal transfer is suppressed. Furthermore, it was found that, even when a polyvinyl pyrrolidone is added, the transfer sensitivity is not greatly decreased.

As a result, the composition of an undercoat layer capable of preventing a decrease in transfer sensitivity and sufficiently suppressing abnormal transfer was found.

According to an aspect of the present invention, there is provided a thermal transfer recording medium including: a heat-resistant sliding layer that is formed on one surface of a substrate; and an undercoat layer and a dye layer that are sequentially laminated on the other surface of the substrate, in which the undercoat layer contains, as major components, a polyvinyl pyrrolidone and a polyvinyl alcohol having a crystallinity degree of 15% or higher, and the dye layer contains an anthraquinone-based thermal transfer dye.

As described below, the upper limit of the crystallinity degree of the polyvinyl alcohol is not particularly limited.

In addition, a coating amount of the undercoat layer after drying may be in a range of 0.05 g/m$^2$ to 0.30 g/m$^2$.

In addition, the dye layer may further contain a polyvinyl acetal resin having a glass transition temperature of 100° C. or higher and a polyvinyl butyral resin having a glass transition temperature of 75° C. or lower.

In addition, a mass content ratio (the polyvinyl acetal resin/the polyvinyl butyral resin) of the polyvinyl acetal resin to the polyvinyl butyral resin may be in a range of 97/3 to 50/50.

In addition, an average value of a surface roughness Ra of the heat-resistant sliding layer before being left to stand in an environment of 150° C. may be in a range of 0.05 to 0.50, an average value of a surface roughness Ra of the heat-resistant sliding layer after being left to stand in an environment of 150° C. for 10 minutes may be in a range of 0.00 to 0.80, and an absolute value of a difference between the average values of the surface roughnesses Ra of the heat-resistant sliding layer before and after being left to stand in an environment of 150° C. for 10 minutes may be in a range of 0.00 to 0.30.

In addition, the heat-resistant sliding layer may contain inorganic particles.

In addition, the thermal transfer recording medium may be a thermal transfer recording medium for forming an image by thermal transfer on a thermal transfer image-receiving sheet in which a water-based receiving layer is formed on a sheet with a water-based hollow particle layer interposed therebetween, the water-based receiving layer containing a water-based binder and a release agent, the water-based hollow particle layer containing a water-based binder and hollow particles, the dye layer may further contain filler particles, and a three-dimensional surface roughness SRa of the dye layer may be in a range of 0.15 μm to 0.70 μm.

In addition, a volume average particle size of the filler particles may be greater than 0.1 μm and less than 3.0 μm.

In addition, the thermal transfer recording medium may be a thermal transfer recording medium for forming an image by thermal transfer on a thermal transfer image-receiving sheet in which a water-based receiving layer is formed on a sheet with a water-based hollow particle layer interposed therebetween, the water-based receiving layer containing a water-based binder and a release agent, the water-based hollow particle layer containing a water-based binder and hollow particles, the dye layer may further contain a release agent containing at least two modified silicone oils, one of the modified silicone oils in the release agent may be a non-reactive silicone oil having a molecular weight of 8,000 or higher and having side chains modified with a polyether, and the other one of the modified silicone oils in the release agent may be a reactive silicone oil having a molecular weight of 5,000 or lower and having both terminals modified with an amino.

In addition, the dye layer may further contain a binder, and a content ratio of the release agent in the dye layer to the binder in the dye layer may be in a range of 0.5 mass % to 2.0 mass %.

In addition, a crystallinity degree of the polyvinyl alcohol contained in the undercoat layer may be higher than or equal to 35%.

Advantageous Effects of Invention

According to the present invention, the undercoat layer contains a polyvinyl pyrrolidone and a polyvinyl alcohol having a crystallinity degree of 15% or higher as major components, and the dye layer contains an anthraquinone-based thermal transfer dye. As a result, it is possible to provide a thermal transfer recording medium capable of obtaining high transfer sensitivity during high-speed printing; obtaining a high-density image without increasing the amount of a dye used in a dye layer; and preventing abnormal transfer during printing even after storage in a high-temperature and high-humidity environment.

BRIEF DESCRIPTION OF DRAWINGS

FIG. 1 is a cross-sectional side view illustrating a thermal transfer recording medium according to an embodiment of the present invention.

DESCRIPTION OF EMBODIMENTS

First Embodiment

Hereinafter, a first embodiment of a thermal transfer recording medium according to the present invention will be described.

(Thermal Transfer Recording Medium)

FIG. 1 is a cross-sectional side view illustrating a configuration of a thermal transfer recording medium 1 according to the first embodiment. As illustrated in FIG. 1, in the thermal transfer recording medium 1 according to the first embodiment, a heat-resistant sliding layer 40 is formed on one surface of a substrate 10, and an undercoat layer 20 and a dye layer 30 are sequentially laminated on the other surface of the substrate 10.

<Substrate>

It is required that the substrate 10 have heat resistance and strength so as not to be softened by thermal pressure in thermal transfer. Therefore, examples of a material of the substrate 10 include films of synthetic resins such as polyethylene terephthalate, polyethylene naphthalate, polypropylene, cellophane, acetate, polycarbonate, polysulfone, polyimide, polyvinyl alcohol, aromatic polyamide, aramid, or polystyrene; papers such as condenser paper and paraffin paper, and the like. These materials may be used alone or in a combination of two or more kinds when being used as the material of the substrate 10. Among the above-described materials, a polyethylene terephthalate film is preferable from the viewpoints of physical properties, workability, cost, and the like. In addition, from the viewpoints of operability and workability, the thickness of the substrate 10 can be in a range of 2 μm to 50 μm. However, from the viewpoint of handleability such as transfer aptitude or workability, the thickness of the substrate 10 is preferably in a range of 2 μm to 9 μm.

In addition, either or both of the surfaces of the substrate 10 on which the heat-resistant sliding layer 40 and the undercoat layer 20 are formed may be subjected to an adhesion treatment. As the adhesion treatment, for example, a well-known technique such as a corona treatment, a flame treatment, an ultraviolet treatment, a radiation treatment, a roughening treatment, a plasma treatment, or a primer treatment can be used. In addition, these treatments can be used in a combination of two or more kinds. In the first embodiment, it is effective to increase the adhesion between the substrate 10 and the undercoat layer 20. From the viewpoint of cost, polyethylene terephthalate subjected to a primer treatment is preferably used.

<Heat-Resistant Sliding Layer>

The heat-resistant sliding layer 40 is a layer that is formed on a side of the thermal transfer recording medium 1 in contact with a thermal head. This heat-resistant sliding layer 40 is provided, for example, for preventing seizure between the thermal head and the thermal transfer recording medium 1 and imparting a sliding property between the thermal head and an ink sheet.

As a material of the heat-resistant sliding layer 40, a well-known material of the related art can be used. Examples of the material of the heat-resistant sliding layer 40 include polyvinyl butyral resins, polyvinyl acetoacetal resins, polyester resins, vinyl chloride-vinyl acetate copolymers, polyether resins, polybutadiene resins, acrylic polyols, polyurethane acrylates, polyester acrylates, polyether acrylates, epoxy acrylates, nitrocellulose resins, cellulose acetate resins, polyamide resins, polyimide resins, polyamideimide resins, polycarbonate resins, polyacrylic resins, and modified compounds thereof. Further, in order to increase the heat resistance of the heat-resistant sliding layer 40, a curing agent may be used as a material of the heat-resistant sliding layer 40. Examples of the curing agent include isocyanates such as tolylene diisocyanate, triphenylmethane triisocyanate, or tetramethylxylene diisocyanate; and derivatives thereof. However, the curing agent is not limited to these examples.

<Undercoat Layer>

The undercoat layer 20 is a layer formed by coating a coating solution containing a polyvinyl alcohol having a crystallinity degree of 15% or higher and a polyvinyl pyrrolidone as major components on a substrate and performing drying.

The term "major components" described herein is used for stating that other components may be further added in addition to the polyvinyl pyrrolidone and the polyvinyl alcohol having a crystallinity degree of 15% or higher as long as the effects of the first embodiment are not impaired. That is, "containing a polyvinyl alcohol having a crystallinity degree of 15% or higher and a polyvinyl pyrrolidone as major components" states that the total content of the polyvinyl pyrrolidone and the polyvinyl alcohol is greater than 50 mass % with respect to the total content during the formation of the undercoat layer. The total content of the polyvinyl pyrrolidone and the polyvinyl alcohol is preferably greater than or equal to 80 mass %.

[Polyvinyl Alcohol]

The undercoat layer 20 has a function of bringing the dye layer 30 and the substrate 10 into close contact with each other and a function of preventing a dye from being transferred to the substrate 10 side during printing. For example, when an anthraquinone-based thermal transfer dye is used as a material of the dye layer 30, it is effective to use a polyvinyl alcohol as a material of the undercoat layer 20. Among polyvinyl alcohols, a polyvinyl alcohol having a crystallinity degree of 15% or higher is more effectively used. The reason is that an effect of preventing a dye from being transferred to the substrate 10 is obtained due to the presence of a crystallized portion. Further, due to the presence of a crystallized portion having a crystallinity degree of 15% or higher, the strength of the undercoat layer 20 is increased, and abnormal transfer can be suppressed. When the crystallinity degree is lower than 15%, the transfer sensitivity is slightly decreased, and abnormal transfer is likely to occur. The upper limit of the crystallinity degree of polyvinyl alcohol is not particularly limited. The range of the crystallinity degree of polyvinyl alcohol according to the first embodiment is a range where the polyvinyl alcohol can be added.

In a method of measuring the crystallinity degree of polyvinyl alcohol according to the first embodiment, the upper limit of a commonly-used polyvinyl alcohol is about 40% but may be higher than 40%. In addition, when polyvinyl alcohol is used alone, abnormal transfer is not sufficiently suppressed after storage in a high-temperature and high-humidity environment. Therefore, polyvinyl pyrrolidone, which is relatively preferable for increasing the adhesion between the substrate 10 and the dye layer 30 after storage in a high-temperature and high-humidity environment, is added in a range not impairing the transfer sensitivity. At this time, by using a polyvinyl alcohol having a crystallinity degree of 15% or higher, the transfer sensitivity is not greatly decreased by the addition of polyvinyl pyrrolidone. On the other hand, when a polyvinyl alcohol having a crystallinity degree of lower than 15% is used, the transfer sensitivity is likely to be decreased as compared to a polyvinyl alcohol having a crystallinity degree of 15% or higher. The reason is presumed to be that, when a polyvinyl alcohol having a low crystallinity degree is used, a crystalline structure of the polyvinyl alcohol is likely to be disturbed by the addition of polyvinyl pyrrolidone.

[Polyvinyl Pyrrolidone]

Examples of the polyvinyl pyrrolidone include homopolymers of vinyl pyrrolidones such as N-vinyl-2-pyrrolidone or N-vinyl-4-pyrrolidone; and copolymers thereof. Further, for example, modified polyvinyl pyrrolidone resins may be used. The modified polyvinyl pyrrolidone resins are copolymers of N-vinyl pyrrolidone-based monomers and other monomers. The copolymerization configuration may be, for example, random copolymerization, block copolymerization, or graft copolymerization, but is not limited thereto. The above-described N-vinyl pyrrolidone-based monomers represent, for example, N-vinyl pyrrolidones (for example, N-vinyl-2-pyrrolidone or N-vinyl-4-pyrrolidone) and derivatives thereof. Examples of the derivatives of N-vinyl pyrrolidones include N-vinyl pyrrolidones having a substituent at a pyrrolidone ring, such as N-vinyl-3-methylpyrrolidone, N-vinyl-5-methylpyrrolidone, N-vinyl-3,3,5-trimethylpyrrolidone, or N-vinyl-3-benzylpyrrolidone.

As monomer components which are copolymerized with the N-vinyl pyrrolidone-based monomers, for example, the following vinyl-polymerizable monomers may be used. Examples of the vinyl-polymerizable monomers include (meth)acrylic monomers such as (meth)acrylic acids, methyl (meth)acrylates, ethyl (meth)acylates, or isopropyl (meth) acylates; unsaturated carboxylic acids such as fumaric acid, maleic acid, or itaconic acid; and ethylene, propylene, vinyl chloride, vinyl acetate, vinyl alcohol, styrene, vinyl toluene, divinylbenzene, vinylidene chloride, tetrafluoroethylene, and vinylidene fluoride.

In the thermal transfer recording medium 1 according to the first embodiment, the content of the polyvinyl pyrrolidone in the undercoat layer 20 is in a range of greater than or equal to 10 mass %, and less than 50 mass %. When the content of the polyvinyl pyrrolidone is less than 10 mass %, abnormal transfer cannot be sufficiently suppressed after storage in a high-temperature and high-humidity environment. In addition, when the content of the polyvinyl pyrrolidone is greater than or equal to 50 mass %, the transfer sensitivity is decreased.

[Coating Amount of Undercoat Layer after Drying]

The coating amount of the undercoat layer 20 after drying is not particularly limited but is preferably in a range of 0.05 g/m$^2$ to 0.30 g/m$^2$. When the coating amount of the undercoat layer 20 after drying is less than 0.05 g/m$^2$, the transfer sensitivity during high-speed printing is insufficient due to deterioration during lamination of the dye layer 30, which may cause a problem in that the adhesion with the substrate 10 or the dye layer 30 deteriorates. On the other hand, when the coating amount of the undercoat layer 20 after drying is greater than 0.30 g/m$^2$, there is a disadvantageous effect on deterioration in the sensitivity of the thermal transfer recording medium 1 itself, which may impair the transfer sensitivity during high-speed printing.

In addition, well-known additives such as colloidal inorganic pigment particles, an isocyanate compound, a silane coupling agent, a dispersant, a viscosity modifier, or a stabilizer can be added to the undercoat layer 20 or to a coating solution for forming the undercoat layer 20 in a range not impairing the performance. By forming the undercoat layer 20 having the above-described configuration, it is possible to obtain the thermal transfer recording medium 1 capable of obtaining a high-density image without increasing the amount of a dye used in the dye layer 30; and capable of preventing abnormal transfer during printing even after storage in a high-temperature and high-humidity environment.

[Method of Measuring Crystallinity Degree]

Examples of a method of measuring a crystallinity degree include a density-gradient tube method, an X-ray diffraction method, an infrared absorption spectroscopy method, and a thermal analysis method.

In the first embodiment, a thermal analysis method is used. Specifically, the crystallinity degree is calculated according to the following expression using ΔH(J/g) of a crystallization process which is obtained by performing differential scanning calorimetry.

Crystallinity Degree(%)=(ΔH/156)×100

In the above expression, "156" represents crystallization energy (J/g) of a completely saponified polyvinyl alcohol (non-modified compound) having a crystallinity degree of 100%.

For the measurement of the crystallinity degree, a cast film having a thickness of 10 μm is prepared and dried in a phosphorus pentoxide desiccator for 10 days. Using a differential scanning calorimeter (hereinafter, referred to as "DSC"), in a first run, this film is held at 28° C. for 2 minutes and is heated to 230° C. at a temperature increase rate of 10° C./min. After heating, the film is held at 230° C. for 2 minutes and is cooled from 230° C. to −30° C. at a temperature decrease rate of 10° C./min to obtain ΔH(J/g) of a crystallization process. As the differential scanning calorimeter, EXSTAR DSC6220 (manufactured by SII Nanotechnology Inc.) is used. "ΔH" described herein represents crystal melting enthalpy.

<Dye Layer>

The dye layer 30 is a layer containing an anthraquinone-based thermal transfer dye. As a material of the dye layer 30, a well-known material of the related art can be used. For example, the dye layer 30 is a layer formed by mixing a thermal transfer dye, a binder, a solvent, and the like with each other to prepare a coating solution for forming a dye layer and performing coating and drying. The dye layer 30 may be a layer including a single layer of one color or may be a layer in which plural dye layers containing different color dyes are sequentially and repeatedly formed on the same surface of the same substrate.

[Thermal Transfer Dye]

The thermal transfer dye contained in the dye layer 30 is a dye which is fused, diffused or sublimated to be transferred by heat. Examples of a yellow component of the thermal transfer dye include solvent yellow 56, 16, 30, 93, and 33; and disperse yellow 201, 231, and 33. Examples of a magenta component of the thermal transfer dye include C.I. disperse violet 31, C.I. disperse red 60, C.I. disperse violet 26, C.I. solvent red 27, and C.I. solvent red 19. Examples of a cyan component of the thermal transfer dye include C.I. disperse blue 354, C.I. solvent blue 63, C.I. solvent blue 36, C.I. solvent blue 266, C.I. solvent blue 257, and C.I. disperse blue 24. Among these, in the first embodiment, an anthraquinone-based thermal transfer dye such as C.I. disperse violet 31, C.I. solvent blue 63, C.I. solvent blue 36, or C.I. disperse blue 24 is used. When the undercoat layer 20 containing a polyvinyl alcohol having a crystallinity degree of 15% or higher is interposed between the substrate 10 and the dye layer 30, the anthraquinone-based thermal transfer dye is superior to other dyes such as an azo-based thermal transfer dye in the transfer efficiency to an image-receiving layer, thereby imparting high transfer sensitivity thereto. That is, the amount of a dye used in the dye layer 30 can be decreased.

[Binder]

As the binder contained in the dye layer 30, any well-known resin binder of the related art can be used and is not particularly limited. Examples of the binder include cellulose resins such as ethyl cellulose, hydroxyethyl cellulose, ethylhydroxy cellulose, hydroxypropyl cellulose, or cellulose acetate; vinyl resins such as polyvinyl alcohol, polyvinyl acetate, polyvinyl acetal, polyvinyl pyrrolidone, or polyacrylamide; and polyester resins, styrene-acrylonitrile copolymer resins, and phenoxy resins.

In this case, a mass content ratio (dye/binder) of the dye to the binder in the dye layer 30 is preferably in a range of 10/100 to 300/100. The reason is as follows. When the ratio (dye/binder) is lower than 10/100, the amount of the dye is excessively small, color developing sensitivity is insufficient, and a satisfactory thermal transfer image may not be obtained. On the other hand, when the ratio (dye/binder) is higher than 300/100, the solubility of the dye in the binder is extremely decreased. Therefore, when the thermal transfer recording medium 1 is obtained, the storage stability is decreased, and the dye is likely to be precipitated. In addition, the dye layer 30 may contain well-known additives such as a disperser, a viscosity modifier, or a stabilizer in a range not impairing the performance.

All of the following, the heat-resistant sliding layer 40, the undercoat layer 20, and the dye layer 30 can be formed by coating a coating solution with a well-known coating method of the related art and performing drying. Examples of the coating method include a gravure coating method, a screen printing method, a spray coating method, and a reverse roll coating method.

Hereinafter, materials used in Examples of the first embodiment and Comparative Examples will be described. Unless specified otherwise, "part(s)" in the following description represents "part(s) by mass".

(Preparation of Substrate Provided with Heat-Resistant Sliding Layer)

As a substrate, a 4.5 μm-thick polyethylene terephthalate film with a single surface subjected to an adhesion treatment was used. A heat-resistant sliding layer-forming coating solution 1 having the following composition was coated on a surface of the substrate which was not subjected to an adhesion treatment using a gravure coating method such that the coating amount thereof after drying was 0.5 g/m². Next, by drying the substrate at 100° C. for 1 minute, a substrate provided with a heat-resistant sliding layer was obtained.

<Heat-Resistant Sliding Layer-Forming Coating Solution 1>

| | |
|---|---|
| Silicon acrylate (US-350, manufactured by Toagosei Co., Ltd.) | 50.0 parts |
| Methyl ethyl ketone (MEK) | 50.0 parts |

(Preparation of Polyvinyl Alcohol (PVA) Resin)

100 parts of vinyl acetate and 10 parts of methanol were prepared and added to a reaction vessel provided with a stirrer, a thermometer, a nitrogen introducing tube, and a reflux condenser. The reaction vessel was degassed by baffling nitrogen gas and was heated to be in a refluxed state. Next, 100 parts of vinyl acetate and 10 parts of methanol were refluxed for 20 minutes, and azobisisobutyronitrile was added thereto in 0.3 mol % (with respect to the total amount of vinyl acetate). Next, after polymerization for 5 hours, a methanol solution of polyvinyl acetate was obtained. The polymerization degree was 95%.

Next, monomers were removed from the methanol solution of polyvinyl acetate in a continuous monomer stripping column such that the remaining monomer amount in the solution was 0.06%. Then, methanol was added to the solution to adjust the polyvinyl acetate concentration to 50%. Next, 5 mmol (with respect to the vinyl acetate monomer unit) of sodium hydroxide was added to the methanol solution, followed by saponification (at 40° C. for about 90 minutes). After this saponification, acetic acid was added to neutralize the solution. As a result, a desired polyvinyl alcohol resin was obtained. The crystallinity degree of the obtained polyvinyl alcohol was 37% when measured by DSC under conditions of a saponification degree of 99 mol % and an average polymerization degree of 2000. In addition, by extracting the solution during the saponification, a polyvinyl alcohols having (saponification degree: 94 mol %, crystallinity degree: 25%), (saponification degree: 88 mol %, crystallinity degree: 15%), and (saponification degree: 83 mol %, crystallinity degree: 10%) were obtained, respectively.

Example 1-1

An undercoat layer-forming coating solution 1-1 having the following composition was coated on the adhesion treatment-subjected surface of the heat-resistant sliding layer-provided substrate using a gravure coating method such that the coating amount thereof after drying was 0.20 g/m². Next, by drying the substrate at 100° C. for 2 minutes, an undercoat layer was formed. Next, a dye layer-forming coating solution 1-1 having the following composition was coated on the undercoat layer using a gravure coating method such that the coating amount thereof after drying was 0.70 g/m². Next, by drying the substrate at 90° C. for 1 minute, a dye layer was formed. As a result, a thermal transfer recording medium of Example 1-1 was obtained.

<Undercoat Layer-Forming Coating Solution 1-1>

| | |
|---|---|
| Polyvinyl alcohol (crystallinity degree: 25%) | 5.0 parts |
| Pure water | 57.0 parts |
| Isopropyl alcohol | 38.0 parts |

<Dye Layer-Forming Coating Solution 1-1>

| | |
|---|---|
| C.I. solvent blue 63 (anthraquinone-based dye) | 6.0 parts |
| Polyvinyl acetal resin | 4.0 parts |
| Toluene | 45.0 parts |
| Methyl ethyl ketone | 45.0 parts |

Example 1-2

A thermal transfer recording medium of Example 1-2 was obtained with the same method as that of Example 1-1, except that, in the thermal transfer recording medium prepared in Example 1-1, the undercoat layer-forming coating solution was changed to an undercoat layer-forming coating solution 1-2 having the following composition.

<Undercoat Layer-Forming Coating Solution 1-2>

| | |
|---|---|
| Polyvinyl alcohol (crystallinity degree: 25%) | 1.8 parts |
| Polyvinyl pyrrolidone | 1.8 parts |
| Pure water | 57.0 parts |
| Isopropyl alcohol | 39.4 parts |

Example 1-3

A thermal transfer recording medium of Example 1-3 was obtained with the same method as that of Example 1-1, except that, in the thermal transfer recording medium prepared in Example 1-1, the undercoat layer-forming coating solution was changed to an undercoat layer-forming coating solution 1-3 having the following composition.

<Undercoat Layer-Forming Coating Solution 1-3>

| | |
|---|---|
| Polyvinylalcohol (crystallinity degree: 15%) | 1.8 parts |
| Polyvinyl pyrrolidone | 1.8 parts |
| Pure water | 57.0 parts |
| Isopropyl alcohol | 39.4 parts |

Example 1-4

A thermal transfer recording medium of Example 1-4 was obtained with the same method as that of Example 1-1, except that, in the thermal transfer recording medium prepared in Example 1-1, the undercoat layer-forming coating solution was changed to an undercoat layer-forming coating solution 1-4 having the following composition.

<Undercoat Layer-Forming Coating Solution 1-4>

| | |
|---|---|
| Polyvinyl alcohol (crystallinity degree: 37%) | 1.8 parts |
| Polyvinyl pyrrolidone | 1.8 parts |
| Pure water | 57.0 parts |
| Isopropyl alcohol | 39.4 parts |

Example 1-5

A thermal transfer recording medium of Example 1-5 was obtained with the same method as that of Example 1-1, except that, in the thermal transfer recording medium prepared in Example 1-2, the undercoat layer was formed by coating and drying such that the coating amount thereof after drying was 0.03 g/m².

Example 1-6

A thermal transfer recording medium of Example 1-6 was obtained with the same method as that of Example 1-1, except that, in the thermal transfer recording medium prepared in Example 1-2, the undercoat layer was formed by coating and drying such that the coating amount thereof after drying was 0.35 g/m².

Comparative Example 1-1

The same dye layer-forming coating solution as that of Example 1-1 was coated on the adhesion treatment-subjected surface of the heat-resistant sliding layer-provided substrate using a gravure coating method without forming an undercoat layer thereon such that the coating amount thereof after drying was 0.70 g/m². Next, by drying the substrate at 90° C. for 1 minute, a dye layer was formed. As a result, a thermal transfer recording medium of Comparative Example 1-1 was obtained.

Comparative Example 1-2

A dye layer-forming coating solution 1-2 having the following composition was coated on the adhesion treatment-subjected surface of the heat-resistant sliding layer-provided substrate using a gravure coating method without forming an undercoat layer thereon such that the coating amount thereof after drying was 0.70 g/m². Next, by drying the substrate at 90° C. for 1 minute, a dye layer was formed. As a result, a thermal transfer recording medium of Comparative Example 1-2 was obtained.
<Dye Layer-Forming Coating Solution 1-2>

| | |
|---|---|
| C. I. solvent blue 266 (azo-based dye) | 3.0 parts |
| Polyvinyl acetal resin | 2.0 parts |
| Toluene | 47.5 parts |
| Methyl ethyl ketone | 47.5 parts |

Comparative Example 1-3

A thermal transfer recording medium of Comparative Example 1-3 was obtained with the same method as that of Example 1-1, except that, in the thermal transfer recording medium prepared in Example 1-1, the undercoat layer-forming coating solution was changed to an undercoat layer-forming coating solution 1-5 having the following composition.

<Undercoat Layer-Forming Coating Solution 1-5>

| | |
|---|---|
| Polyvinyl alcohol (crystallinity degree: 10%) | 5.0 parts |
| Pure water | 57.0 parts |
| Isopropyl alcohol | 38.0 parts |

Comparative Example 1-4

A thermal transfer recording medium of Comparative Example 1-4 was obtained with the same method as that of Example 1-1, except that, in the thermal transfer recording medium prepared in Example 1-1, the undercoat layer-forming coating solution was changed to an undercoat layer-forming coating solution 1-6 having the following composition.
<Undercoat Layer-Forming Coating Solution 1-6>

| | |
|---|---|
| Polyvinyl alcohol (crystallinity degree: 10%) | 1.8 parts |
| Polyvinyl pyrrolidone | 1.8 parts |
| Pure water | 57.0 parts |
| Isopropyl alcohol | 38.5 parts |

Comparative Example 1-5

A thermal transfer recording medium of Comparative Example 1-5 was obtained with the same method as that of Example 1-1, except that, in the thermal transfer recording medium prepared in Comparative Example 1-3, the dye layer-forming coating solution was changed to the dye layer-forming coating solution 1-2.

Comparative Example 1-6

A thermal transfer recording medium of Comparative Example 1-6 was obtained with the same method as that of Example 1-1, except that, in the thermal transfer recording medium prepared in Example 1-1, the dye layer-forming coating solution was changed to the dye layer-forming coating solution 1-2.

Comparative Example 1-7

A thermal transfer recording medium of Comparative Example 1-7 was obtained with the same method as that of Example 1-1, except that, in the thermal transfer recording medium prepared in Example 1-2, the dye layer-forming coating solution was changed to the dye layer-forming coating solution 1-2.

Comparative Example 1-8

A thermal transfer recording medium of Comparative Example 1-8 was obtained with the same method as that of Example 1-1, except that, in the thermal transfer recording medium prepared in Example 1-1, the undercoat layer-forming coating solution was changed to an undercoat layer-forming coating solution 1-7 having the following composition.
<Undercoat Layer-Forming Coating Solution 1-7>

| | |
|---|---|
| Polyvinyl pyrrolidone | 5.0 parts |
| Pure water | 57.0 parts |
| Isopropyl alcohol | 38.0 parts |

(Preparation of Transfer Medium 1)

As a substrate, a 188 μm-thick white foaming polyethylene terephthalate film was used. An image-receiving layer-forming coating solution 1 having the following composition was coated on one surface of the substrate using a gravure coating method such that the coating amount thereof after drying was 5.0 g/m², followed by drying. As a result, a transfer medium 1 for thermal transfer was prepared.

<Image-Receiving Layer-Forming Coating Solution 1>

| | |
|---|---|
| Vinyl chloride-vinyl acetate-vinyl alcohol copolymer | 19.5 parts |
| Amino-modified silicone oil | 0.5 parts |
| Toluene | 40.0 parts |
| Methyl ethyl ketone | 40.0 parts |

<Adhesion Evaluation of Dye Layer at Room Temperature>

Regarding the thermal transfer recording mediums of Examples 1-1 to 1-6 and Comparative Examples 1-1 to 1-8, a cellophane tape having a width of 18 mm and a length of 150 mm was attached on the dye layer of the thermal transfer recording medium stored at room temperature. Next, when the tape was immediately detached, whether or not the attachment of the dye layer on the cellophane tape side was observed was investigated for the evaluation, and the results thereof are shown in Table 1.

The evaluation was performed based on the following criteria. A or higher is a level at which there was practically no problem.

O: The attachment of the dye layer was not observed

Δ: The attachment of the dye layer was observed to an extremely small degree

X: The attachment of the dye layer was observed on the entire surface

<Printing Evaluation>

Regarding the thermal transfer recording mediums of Examples 1-1 to 1-6 and Comparative Examples 1-1 to 1-8, a printing evaluation was performed using the thermal transfer recording medium stored at room temperature, the thermal transfer recording medium stored in an environment of 40° C. and 90% RH for 72 hours and further stored at room temperature for 24 hours, and the transfer medium 1. By printing solid images using a thermal simulator, a maximum reflection density and whether or not abnormal transfer was observed were investigated for the evaluation, and the results thereof are shown in Table 1. "Maximum reflection density" in Table 1 which is an index indicating "transfer sensitivity (transfer density)" is a value obtained by measuring printed materials during high-energy printing with a spectrodensitometer "528" (manufactured by X-Rite inc.).

Printing conditions are as follows.
Printing environment: 23° C., 50% RH
Printing voltage: 29 V
Line period: 0.7 msec
Print density: main scanning: 300 dpi, sub scanning: 300 dpi <Abnormal Transfer Evaluation>

Abnormal transfer was evaluated based on the following criteria. A or higher is a level at which there was practically no problem.

O: Abnormal transfer to the transfer medium 1 was not observed

ΔO: Abnormal transfer to the transfer medium 1 was observed to an extremely small degree Δ: Abnormal transfer to the transfer medium 1 was observed to a small degree X: Abnormal transfer to the transfer medium 1 was observed on the entire surface

TABLE 1

| | Coating Amount (g/m²) of Undercoat Layer after Drying | Adhesion of Dye Layer at Room Temperature | Printing Evaluation | | | |
|---|---|---|---|---|---|---|
| | | | Product Stored at Room Temperature | | Product Stored in High-Temperature and High-Humidity Environment (72 h) | |
| | | | Maximum Reflection Density | Abnormal Transfer | Maximum Reflection Density | Abnormal Transfer |
| Ex. 1-1 | 0.2 | O | 2.55 | O | 2.25 | Δ |
| Ex. 1-2 | 0.2 | O | 2.51 | O | 2.49 | O |
| Ex. 1-3 | 0.2 | O | 2.50 | O | 2.48 | O |
| Ex. 1-4 | 0.2 | O | 2.55 | O | 2.53 | O |
| Ex. 1-5 | 0.03 | O | 2.53 | O | 2.51 | Δ |
| Ex. 1-6 | 0.35 | O | 2.48 | O | 2.46 | O |
| Comp. Ex. 1-1 | — | — | 1.85 | O | 1.83 | O |
| Comp. Ex. 1-2 | — | — | 1.85 | O | 1.83 | O |
| Comp. Ex. 1-3 | 0.2 | O | 2.45 | Δ | Not Able to Be Measured | X |
| Comp. Ex. 1-4 | 0.2 | O | 2.29 | O | 2.30 | Δ |
| Comp. Ex. 1-5 | 0.2 | O | 2.16 | Δ | Not Able to Be Measured | X |
| Comp. Ex. 1-6 | 0.2 | O | 2.27 | O | 2.25 | ΔO |
| Comp. Ex. 1-7 | 0.2 | O | 2.19 | O | 2.17 | O |
| Comp. Ex. 1-8 | 0.2 | O | 1.98 | O | 1.96 | O |

In the results of Table 1, when the thermal transfer recording mediums of Examples 1-1 to 1-6 in which the undercoat layer was provided were compared to the thermal transfer recording mediums of Comparative Examples 1-1 and 1-2 in which the undercoat layer was not provided, the maximum reflection density was clearly higher. It was found from the results that the transfer sensitivity was high during high-speed printing.

In addition, when Example 1-1 was compared to Comparative Examples 1-1, 1-2, and 1-5, in the absence of polyvinyl alcohol, a difference in transfer density between the anthraquinone-based dye and the other dyes was not shown. However, in the presence of polyvinyl alcohol, a difference in transfer density between the anthraquinone-based dye and the other dyes was shown. It was found from this result that polyvinyl alcohol had an effect of improving transfer sensitivity on the anthraquinone-based dye.

Further, when Comparative Example 1-8 containing polyvinyl pyrrolidone was compared to the examples containing polyvinyl alcohol, deterioration in adhesion after storage in a high-temperature and high-humidity environment was not shown. However, it was found from low maximum reflection density that the transfer sensitivity was low.

In addition, in Example 1-1 and Comparative Example 1-3, when a polyvinyl alcohol having a crystallinity degree of 10% was used for the undercoat layer, abnormal transfer was observed after storage in a high-temperature and high-humidity environment. However, it was found that, when a polyvinyl alcohol having a crystallinity degree of 25% was used for the undercoat layer, abnormal transfer was observed to a small degree but was greatly improved.

Further, in Example 1-2 and Comparative Example 1-4, it was found that, in the presence of polyvinyl pyrrolidone, the adhesion after storage in a high-temperature and high-humidity environment was improved and abnormal transfer was suppressed. However, in Examples 1-2 to 1-4 in which polyvinyl alcohols having crystallinity degrees of 15%, 25%, and 37% were used, respectively, abnormal transfer was not observed. On the other hand, in Comparative Example 1-4 in which a polyvinyl alcohol having a crystallinity degree of 10% was used, abnormal transfer was still observed. Further, in Examples 1-1 to 1-4 and Comparative Examples 1-3 and 1-4, when the crystallinity degree of polyvinyl alcohol was higher than or equal to 15%, the transfer density was not greatly decreased by the addition of polyvinyl pyrrolidone; however, when the crystallinity degree of polyvinyl alcohol was less than 15%, the transfer density was greatly decreased. It was found that from the results that the crystallinity degree of polyvinyl alcohol was necessarily higher than or equal to 15%.

In addition, when the thermal transfer recording medium of Example 1-5 was compared to the thermal transfer recording medium of Example 1-2, it was found that the adhesion after storage in a high-temperature and high-humidity was decreased to some extent because the coating amount of the undercoat layer was less than 0.05 g/m$^2$.

In addition, when the thermal transfer recording medium of Example 1-6 was also compared to the thermal transfer recording medium of Example 1-2, it was found that the effect of improving the transfer sensitivity was decreased because the coating amount of the undercoat layer was greater than 0.30 g/m$^2$.

As described above, in the thermal transfer recording medium 1 according to the first embodiment, the undercoat layer 20 contains a polyvinyl pyrrolidone and a polyvinyl alcohol having a crystallinity degree of 15% or higher as major components, and the dye layer 30 contains an anthraquinone-based thermal transfer dye. As a result, it is possible to provide a thermal transfer recording medium capable of obtaining high transfer sensitivity during high-speed printing; obtaining a high-density image without increasing the amount of a dye used in a dye layer; and preventing abnormal transfer during printing even after storage in a high-temperature and high-humidity environment.

Second Embodiment

Hereinafter, a second embodiment of the thermal transfer recording medium according to the present invention will be described.
(Thermal Transfer Recording Medium)

The thermal transfer recording medium according to the second embodiment is a thermal transfer recording medium having the same structure as that of the thermal transfer recording medium 1 described in the first embodiment. That is, in the thermal transfer recording medium according to the second embodiment, as illustrated in FIG. 1, the heat-resistant sliding layer 40 is formed on one surface of the substrate 10, and the undercoat layer 20 and the dye layer 30 are sequentially laminated on the other surface of the substrate 10.

The second embodiment is different from the first embodiment mainly in that a different material of the dye layer 30 is used, but the other configurations are the same. Accordingly, in the following description, only the above-described different configuration will be described, and the description of the same configurations will not be repeated.
<Dye Layer>

The dye layer 30 according to the second embodiment is a layer containing a polyvinyl acetal resin having a glass transition temperature of 100° C. or higher, a polyvinyl butyral resin having a glass transition temperature of 75° C. or lower, and an anthraquinone-based thermal transfer dye. As a material of the dye layer 30, a well-known material of the related art can be used. For example, the dye layer 30 is a layer formed by mixing a thermal transfer dye, resins, a solvent, and the like with each other to prepare a coating solution for forming a dye layer and performing coating and drying. The dye layer 30 may be a layer including a single layer of one color or may be a layer in which plural dye layers containing different color dyes are sequentially and repeatedly formed on the same surface of the same substrate.

The thermal transfer dye in the second embodiment is the same as that of the first embodiment. Accordingly, the description of the thermal transfer dye in the second embodiment will not be repeated.
[Resin]

As the resins contained in the dye layer 30, well-known resins can be used as long as the resins include a polyvinyl acetal resin having a glass transition temperature of 100° C. or higher and a polyvinyl butyral resin having a glass transition temperature of 75° C. or lower.

By using a polyvinyl acetal resin having a glass transition temperature of 75° C. or lower, the dye is likely to be sublimated and has an advantageous effect in that the transfer sensitivity is increased particularly in a low-density portion. However, a polyvinyl butyral resin has problems in that heat resistance is insufficient, wrinkling occurs due to the extension of the thermal transfer recording medium, and printing defects occur in a transfer medium due to wrinkling. In a polyvinyl acetal resin having a glass transition temperature of 100° C. or higher, heat resistance is high; however, when the amount of energy applied to a thermal head is small, the dye is not easily sublimated, and sufficient transfer sensitivity is not obtained in a low-density portion. By using the above-described two kinds of resins, the transfer sensitivity in a low-density portion is improved, and heat resistance is increased.

When a polyvinyl butyral resin having a glass transition temperature of higher than 75° C., the dye is not easily sublimated, and sufficient transfer sensitivity is not obtained in a low-density portion. In addition, when a polyvinyl acetal resin having a glass transition temperature of lower than 100° C. is used, heat resistance is decreased.

In addition, the upper limit of the glass transition temperature of the polyvinyl butyral resin is not particularly limited. In addition, the lower limit of the polyvinyl acetal resin is not particularly limited.

In this case, a mass content ratio (dye/resins) of the dye to the resins in the dye layer 30 is preferably in a range of 10/100 to 300/100. The reason is as follows. When the ratio (dye/resins) is lower than 10/100, the amount of the dye is excessively small, color developing sensitivity is insufficient, and a satisfactory thermal transfer image may not be obtained. On the other hand, when the ratio (dye/resins) is higher than 300/100, the solubility of the dye in the binder is extremely decreased. Therefore, when the thermal transfer recording medium 1 is obtained, the storage stability is decreased, and the dye is likely to be precipitated. In addition, the dye layer 30 may contain well-known additives such as a disperser, a viscosity modifier, or a stabilizer in a range not impairing the performance.

As described below, amass content ratio (the polyvinyl acetal resin/the polyvinyl butyral resin) of the polyvinyl acetal resin having a glass transition temperature of 100° C. or higher to the polyvinyl butyral resin having a glass transition temperature of 75° C. or lower is preferably in a range of 97/3 to 50/50. When the content ratio of the polyvinyl butyral resin having a glass transition temperature of 75° C. or lower is lower than 97/3 of the mass content ratio (the polyvinyl acetal resin/the polyvinyl butyral resin), the effect of improving the transfer sensitivity in a low-density portion is obtained but small. In addition, when the content ratio of the polyvinyl butyral resin having a glass transition temperature of 75° C. or lower is higher than 50/50 of the mass content ratio (the polyvinyl acetal resin/the polyvinyl butyral resin), the transfer sensitivity in a low-density portion is sufficient, but the deformation and the elongation of the thermal transfer recording medium are increased.

Hereinafter, materials used in Examples of the second embodiment and Comparative Examples will be described. Unless specified otherwise, "part (s)" in the following description represents "part (s) by mass".

(Preparation of Substrate Provided with Heat-Resistant Sliding Layer)

As a substrate, a 4.5 μm-thick polyethylene terephthalate film with a single surface subjected to an adhesion treatment was used. A heat-resistant sliding layer-forming coating solution 2 having the following composition was coated on a surface of the substrate which was not subjected to an adhesion treatment using a gravure coating method such that the coating amount thereof after drying was 0.5 g/m². Next, by drying the substrate at 100° C. for 1 minute, a substrate provided with a heat-resistant sliding layer was obtained.

<Heat-Resistant Sliding Layer-Forming Coating Solution 2>

| Silicon acrylate (US-350, manufactured by Toagosei Co., Ltd. ) | 50.0 parts |
| --- | --- |
| Methyl ethyl ketone (MEK) | 50.0 parts |

(Preparation of Polyvinyl Alcohol (PVA) Resin)

The preparation of a PVA resin in the second embodiment is the same as (Preparation of Polyvinyl Alcohol (PVA) Resin) described in the first embodiment. Accordingly, the description of the preparation of the PVA resin in the second embodiment will not be repeated.

Example 2-1

An undercoat layer-forming coating solution 2-1 having the following composition was coated on the adhesion treatment-subjected surface of the heat-resistant sliding layer-provided substrate using a gravure coating method such that the coating amount thereof after drying was 0.20 g/m². Next, by drying the substrate at 100° C. for 2 minutes, an undercoat layer was formed. Next, a dye layer-forming coating solution 2-1 having the following composition was coated on the undercoat layer using a gravure coating method such that the coating amount thereof after drying was 0.70 g/m². Next, by drying the substrate at 90° C. for 1 minute, a dye layer was formed. As a result, a thermal transfer recording medium of Example 2-1 was obtained. "Tg" described below represents a glass transition temperature.

<Undercoat Layer-Forming Coating Solution 2-1>

| Polyvinyl alcohol (crystallinity degree: 25%) | 5.0 parts |
| --- | --- |
| Pure water | 57.0 parts |
| Isopropyl alcohol | 38.0 parts |

<Dye Layer-Forming Coating Solution 2-1>

| C. I. solvent blue 63 (anthraquinone-based dye) | 6.0 parts |
| --- | --- |
| # 5000-D (polyvinyl acetal resin, Tg: 110° C.) | 3.6 parts |
| # 3000-1 (polyvinyl butyral resin, Tg: 68° C.) | 0.4 parts |
| Polyvinyl acetal resin/polyvinyl butyral resin | 90/10 |
| Toluene | 45.0 parts |
| Methyl ethyl ketone | 45.0 parts |

Example 2-2

A thermal transfer recording medium of Example 2-2 was obtained with the same method as that of Example 2-1, except that, in the thermal transfer recording medium prepared in Example 2-1, the undercoat layer-forming coating solution was changed to an undercoat layer-forming coating solution 2-2 having the following composition.

<Undercoat Layer-Forming Coating Solution 2-2>

| Polyvinyl alcohol (crystallinity degree: 25%) | 1.8 parts |
| --- | --- |
| Polyvinyl pyrrolidone | 1.8 parts |
| Pure water | 57.0 parts |
| Isopropyl alcohol | 39.4 parts |

Example 2-3

A thermal transfer recording medium of Example 2-3 was obtained with the same method as that of Example 2-1, except that, in the thermal transfer recording medium prepared in Example 2-1, the undercoat layer-forming coating solution was changed to an undercoat layer-forming coating solution 2-3 having the following composition.

<Undercoat Layer-Forming Coating Solution 2-3>

| Polyvinyl alcohol (crystallinity degree: 15%) | 1.8 parts |
| --- | --- |
| Polyvinyl pyrrolidone | 1.8 parts |
| Pure water | 57.0 parts |
| Isopropyl alcohol | 39.4 parts |

Example 2-4

A thermal transfer recording medium of Example 2-4 was obtained with the same method as that of Example 2-1, except that, in the thermal transfer recording medium prepared in Example 2-1, the undercoat layer-forming coating solution was changed to an undercoat layer-forming coating solution 2-4 having the following composition.

<Undercoat Layer-Forming Coating Solution 2-4>

| | |
|---|---|
| Polyvinyl alcohol (crystallinity degree: 37%) | 1.8 parts |
| Polyvinyl pyrrolidone | 1.8 parts |
| Pure water | 57.0 parts |
| Isopropyl alcohol | 39.4 parts |

Example 2-5

A thermal transfer recording medium of Example 2-5 was obtained with the same method as that of Example 2-1, except that, in the thermal transfer recording medium prepared in Example 2-2, the undercoat layer was formed by coating and drying such that the coating amount thereof after drying was 0.03 g/m$^2$.

Example 2-6

A thermal transfer recording medium of Example 2-6 was obtained with the same method as that of Example 2-1, except that, in the thermal transfer recording medium prepared in Example 2-2, the undercoat layer was formed by coating and drying such that the coating amount thereof after drying was 0.35 g/m$^2$.

Example 2-7

A thermal transfer recording medium of Example 2-7 was obtained with the same method as that of Example 2-1, except that, in the thermal transfer recording medium prepared in Example 2-2, the dye layer-forming coating solution was changed to a dye layer-forming coating solution 2-2 having the following composition.

<Dye Layer-Forming Coating Solution 2-2>

| | |
|---|---|
| C. I. solvent blue 63 (anthraquinone-based dye) | 6.0 parts |
| #5000-D (polyvinyl acetal resin, Tg: 110° C.) | 3.92 parts |
| #3000-1 (polyvinyl butyral resin, Tg: 68° C.) | 0.08 parts |
| Polyvinyl acetal resin/polyvinyl butyral resin | 98/2 |
| Toluene | 45.0 parts |
| Methyl ethyl ketone | 45.0 parts |

Example 2-8

A thermal transfer recording medium of Example 2-8 was obtained with the same method as that of Example 2-1, except that, in the thermal transfer recording medium prepared in Example 2-2, the dye layer-forming coating solution was changed to a dye layer-forming coating solution 2-3 having the following composition.

<Dye Layer-Forming Coating Solution 2-3>

| | |
|---|---|
| C. I. solvent blue 63 (anthraquinone-based dye) | 6.0 parts |
| #5000-D (polyvinyl acetal resin, Tg: 110° C.) | 3.8 parts |
| #3000-1 (polyvinyl butyral resin, Tg: 68° C.) | 0.2 parts |
| Polyvinyl acetal resin/polyvinyl butryal resin | 95/5 |
| Toluene | 45.0 parts |
| Methyl ethyl ketone | 45.0 parts |

Example 2-9

A thermal transfer recording medium of Example 2-9 was obtained with the same method as that of Example 2-1, except that, in the thermal transfer recording medium prepared in Example 2-2, the dye layer-forming coating solution was changed to a dye layer-forming coating solution 2-4 having the following composition.

<Dye Layer-Forming Coating Solution 2-4>

| | |
|---|---|
| C. I. solvent blue 63 (anthraquinone-based dye) | 6.0 parts |
| #5000-D (polyvinyl acetal resin, Tg: 110° C.) | 2.0 parts |
| #3000-1 (polyvinyl butyral resin, Tg: 68° C.) | 2.0 parts |
| Polyvinyl acetal resin/polyvinyl butyral resin | 50/50 |
| Toluene | 45.0 parts |
| Methyl ethyl ketone | 45.0 parts |

Example 2-10

A thermal transfer recording medium of Example 2-10 was obtained with the same method as that of Example 2-1, except that, in the thermal transfer recording medium prepared in Example 2-2, the dye layer-forming coating solution was changed to a dye layer-forming coating solution 2-5 having the following composition.

<Dye Layer-Forming Coating Solution 2-5>

| | |
|---|---|
| C. I. solvent blue 63 (anthraquinone-based dye) | 6.0 parts |
| #5000-D (polyvinyl acetal resin, Tg: 110° C.) | 1.6 parts |
| #3000-1 (polyvinyl butyral resin, Tg: 68° C.) | 2.4 parts |
| Polyvinyl acetal resin/polyvinyl butyral resin | 40/60 |
| Toluene | 45.0 parts |
| Methyl ethyl ketone | 45.0 parts |

Comparative Example 2-1

The same dye layer-forming coating solution as that of Example 2-1 was coated on the adhesion treatment-subjected surface of the heat-resistant sliding layer-provided substrate using a gravure coating method without forming an undercoat layer thereon such that the coating amount thereof after drying was 0.70 g/m$^2$. Next, by drying the substrate at 90° C. for 1 minute, a dye layer was formed. As a result, a thermal transfer recording medium of Comparative Example 2-1 was obtained.

Comparative Example 2-2

A dye layer-forming coating solution 2-6 having the following composition was coated on the adhesion treatment-subjected surface of the heat-resistant sliding layer-provided substrate using a gravure coating method without forming an undercoat layer thereon such that the coating amount thereof after drying was 0.70 g/m$^2$. Next, by drying the substrate at 90° C. for 1 minute, a dye layer was formed. As a result, a thermal transfer recording medium of Comparative Example 2-2 was obtained.

<Dye Layer-Forming Coating Solution 2-6>

| | |
|---|---|
| C.I. solvent blue 266 (azo-based dye) | 3.0 parts |
| #5000-D (polyvinyl acetal resin, Tg: 110° C.) | 1.8 parts |
| #3000-1 (polyvinyl butyral resin, Tg: 68° C.) | 0.2 parts |
| Polyvinyl acetal resin/polyvinyl butyral resin | 90/10 |
| Toluene | 47.5 parts |
| Methyl ethyl ketone | 47.5 parts |

Comparative Example 2-3

A thermal transfer recording medium of Comparative Example 2-3 was obtained with the same method as that of Example 2-1, except that, in the thermal transfer recording medium prepared in Example 2-1, the undercoat layer-forming coating solution was changed to an undercoat layer-forming coating solution 2-5 having the following composition.

<Undercoat Layer-Forming Coating Solution 2-5>

| | |
|---|---|
| Polyvinyl alcohol (crystallinity degree: 10%) | 5.0 parts |
| Pure water | 57.0 parts |
| Isopropyl alcohol | 38.0 parts |

Comparative Example 2-4

A thermal transfer recording medium of Comparative Example 2-4 was obtained with the same method as that of Example 2-1, except that, in the thermal transfer recording medium prepared in Example 2-1, the undercoat layer-forming coating solution was changed to an undercoat layer-forming coating solution 2-6 having the following composition.

<Undercoat Layer-Forming Coating Solution 2-6>

| | |
|---|---|
| Polyvinyl alcohol (crystallinity degree: 10%) | 1.8 parts |
| Polyvinyl pyrrolidone | 1.8 parts |
| Pure water | 57.0 parts |
| Isopropyl alcohol | 38.5 parts |

Comparative Example 2-5

A thermal transfer recording medium of Comparative Example 2-5 was obtained with the same method as that of Example 2-1, except that, in the thermal transfer recording medium prepared in Comparative Example 2-3, the dye layer-forming coating solution was changed to the dye layer-forming coating solution 2-6.

Comparative Example 2-6

A thermal transfer recording medium of Comparative Example 2-6 was obtained with the same method as that of Example 2-1, except that, in the thermal transfer recording medium prepared in Example 2-1, the dye layer-forming coating solution was changed to the dye layer-forming coating solution 2-6.

Comparative Example 2-7

A thermal transfer recording medium of Comparative Example 2-7 was obtained with the same method as that of Example 2-1, except that, in the thermal transfer recording medium prepared in Example 2-2, the dye layer-forming coating solution was changed to the dye layer-forming coating solution 2-6.

Comparative Example 2-8

A thermal transfer recording medium of Comparative Example 2-8 was obtained with the same method as that of Example 2-1, except that, in the thermal transfer recording medium prepared in Example 2-1, the undercoat layer-forming coating solution was changed to an undercoat layer-forming coating solution 2-7 having the following composition.

<Undercoat Layer-Forming Coating Solution 2-7>

| | |
|---|---|
| Polyvinyl pyrrolidone | 5.0 parts |
| Pure water | 57.0 parts |
| Isopropyl alcohol | 38.0 parts |

Comparative Example 2-9

A thermal transfer recording medium of Comparative Example 2-9 was obtained with the same method as that of Example 2-1, except that, in the thermal transfer recording medium prepared in Example 2-2, the dye layer-forming coating solution was changed to a dye layer-forming coating solution 2-7 having the following composition.

<Dye Layer-Forming Coating Solution 2-7>

| | |
|---|---|
| C.I. solvent blue 63 (anthraquinone-based dye) | 6.0 parts |
| #3000-1 (polyvinyl butyral resin, Tg: 68° C.) | 4.0 parts |
| Polyvinyl acetal resin/polyvinyl butyral resin | 0/100 |
| Toluene | 45.0 parts |
| Methyl ethyl ketone | 45.0 parts |

Comparative Example 2-10

A thermal transfer recording medium of Comparative Example 2-10 was obtained with the same method as that of Example 2-1, except that, in the thermal transfer recording medium prepared in Example 2-2, the dye layer-forming coating solution was changed to a dye layer-forming coating solution 2-8 having the following composition.

<Dye Layer-Forming Coating Solution 2-8>

| | |
|---|---|
| C.I. solvent blue 63 (anthraquinone-based dye) | 6.0 parts |
| #5000-D (polyvinyl acetal resin, Tg: 110° C.) | 4.0 parts |
| Polyvinyl acetal resin/polyvinyl butyral resin | 100/0 |
| Toluene | 45.0 parts |
| Methyl ethyl ketone | 45.0 parts |

(Preparation of Transfer Medium 2)

As a substrate, a 188 μm-thick white foaming polyethylene terephthalate film was used. An image-receiving layer-forming coating solution 2 having the following composition was coated on one surface of the substrate using a gravure coating method such that the coating amount thereof after drying was 5.0 g/m², followed by drying. As a result, a transfer medium 2 for thermal transfer was prepared.

<Image-Receiving Layer-Forming Coating Solution 2>

The image-receiving layer-forming coating solution 2 in the second embodiment is the same as <Image-Receiving Layer-Forming Coating Solution 1> described in the first embodiment. Accordingly, the description of the image-receiving layer-forming coating solution 2 in the second embodiment will not be repeated.

<Adhesion Evaluation of Dye Layer at Room Temperature>

Regarding the thermal transfer recording mediums of Examples 2-1 to 2-6 and Comparative Examples 2-1 to 2-8, a cellophane tape having a width of 18 mm and a length of 150 mm was attached on the dye layer of the thermal transfer recording medium stored at room temperature. Next, when the tape was immediately detached, whether or not the attachment of the dye layer on the cellophane tape side was observed was investigated for the evaluation, and the results thereof are shown in Table 2.

The criteria of the adhesion evaluation in the second embodiment are the same as those of <Adhesion Evaluation of Dye Layer at Room Temperature> described in the first embodiment. Accordingly, the description of the criteria of the adhesion evaluation in the second embodiment will not be repeated.

<Printing Evaluation>

Regarding the thermal transfer recording mediums of Examples 2-1 to 2-10 and Comparative Examples 2-1 to 2-10, a printing evaluation was performed using the thermal transfer recording medium stored at room temperature, the thermal transfer recording medium stored in an environment of 40° C. and 90% RH for 72 hours and further stored at room temperature for 24 hours, and the transfer medium 2. By printing solid images using a thermal simulator, a maximum reflection density and whether or not abnormal transfer was observed were investigated for the evaluation, and the results thereof are shown in Table 2. In addition, in the above-described method, using the thermal transfer recording medium stored at room temperature, gray scale 0 to gray scale 255, which was the maximum reflection density, were classified into 11 regions, and the reflection density at each gray scale was evaluated. The results are shown in Table 3. Regarding the transfer sensitivity in a low-density portion, the reflection densities in gray scale 23 to gray scale 46 were evaluated. In addition, regarding the transfer sensitivity in a high-density portion, the reflection densities in gray scale 255 were evaluated.

"Maximum reflection density" in Table 2 which is an index indicating "transfer sensitivity (transfer density)" is a value obtained by measuring printed materials during high-energy printing with a spectrodensitometer "528" (manufactured by X-Rite inc.). In addition, the printing conditions in the second embodiment are the same as those in <Printing Evaluation> described in the first embodiment. Accordingly, the description of the printing conditions in the second embodiment will not be repeated.

<Abnormal Transfer Evaluation>

Abnormal transfer was evaluated based on the following criteria. A or higher is a level at which there was practically no problem.

O: Abnormal transfer to the transfer medium 2 was not observed

ΔO: Abnormal transfer to the transfer medium 2 was observed to an extremely small degree Δ: Abnormal transfer to the transfer medium 2 was observed to a small degree X: Abnormal transfer to the transfer medium 2 was observed on the entire surface <Wrinkling Evaluation>

Wrinkling was evaluated based on the following criteria. B or higher is a level at which there was practically no problem.

O: Printing defects caused by the wrinkling of the thermal transfer recording medium were not observed in the transfer medium 2

ΔO: Printing defects caused by the wrinkling of the thermal transfer recording medium were not observed in the transfer medium 2, but the deformation and the elongation of the thermal transfer recording medium were large Δ: A small amount of printing defects caused by the wrinkling of the thermal transfer recording medium were observed in the transfer medium 2

X: Printing defects caused by the wrinkling of the thermal transfer recording medium were observed on the entire surface of the transfer medium 2.

TABLE 2

| | Coating Amount (g/m$^2$) of Under-coat Layer after Drying | Adhesion of Dye Layer at Room Temperature | Content Ratio of Polyvinyl Acetal Resin to Polyvinyl Butyral Resin | | Product Stored at Room Temperature | | | Product Stored in High-Temperature and High-Humidity Environment (72 h) | |
|---|---|---|---|---|---|---|---|---|---|
| | | | Polyvinyl Acetal Resin | Polyvinyl Butyral Resin | Maximum Reflection Density | Abnormal Transfer | Wrinkling | Maximum Reflection Density | Abnormal Transfer |
| Ex. 2-1 | 0.2 | O | 90 | 10 | 2.55 | O | O | 2.55 | ΔO |
| Ex. 2-2 | 0.2 | O | 90 | 10 | 2.51 | O | O | 2.49 | O |
| Ex. 2-3 | 0.2 | O | 90 | 10 | 2.50 | O | O | 2.48 | O |
| Ex. 2-4 | 0.2 | O | 90 | 10 | 2.55 | O | O | 2.53 | O |
| Ex. 2-5 | 0.03 | O | 90 | 10 | 2.52 | O | O | 2.51 | Δ |
| Ex. 2-6 | 0.35 | O | 90 | 10 | 2.48 | O | O | 2.46 | O |
| Ex. 2-7 | 0.2 | O | 98 | 2 | 2.51 | O | O | 2.49 | O |
| Ex. 2-8 | 0.2 | O | 95 | 5 | 2.51 | O | O | 2.49 | O |
| Ex. 2-9 | 0.2 | O | 50 | 50 | 2.52 | O | O | 2.50 | O |
| Ex. 2-10 | 0.2 | O | 40 | 60 | 2.52 | O | OΔ | 2.50 | O |
| Comp. Ex. 2-1 | — | — | 90 | 10 | 1.85 | O | O | 1.83 | O |
| Comp. Ex. 2-2 | — | — | 90 | 10 | 1.85 | O | O | 1.83 | O |
| Comp. Ex. 2-3 | 0.2 | O | 90 | 10 | 2.44 | Δ | O | Not Able to Be Measured | X |
| Comp. Ex. 2-4 | 0.2 | O | 90 | 10 | 2.29 | Δ | O | 2.30 | Δ |
| Comp. Ex. 2-5 | 0.2 | O | 90 | 10 | 2.16 | Δ | O | Not Able to Be Measured | X |
| Comp. Ex. 2-6 | 0.2 | O | 90 | 10 | 2.28 | O | O | 2.26 | ΔO |

TABLE 2-continued

| | Coating Amount (g/m²) of Undercoat Layer after Drying | Adhesion of Dye Layer at Room Temperature | Content Ratio of Polyvinyl Acetal Resin to Polyvinyl Butyral Resin | | Printing Evaluation | | | | |
|---|---|---|---|---|---|---|---|---|---|
| | | | | | Product Stored at Room Temperature | | | Product Stored in High-Temperature and High-Humidity Environment (72 h) | |
| | | | Polyvinyl Acetal Resin | Polyvinyl Butyral Resin | Maximum Reflection Density | Abnormal Transfer | Wrinkling | Maximum Reflection Density | Abnormal Transfer |
| Comp. Ex. 2-7 | 0.2 | ○ | 90 | 10 | 2.19 | ○ | ○ | 2.17 | Δ○ |
| Comp. Ex. 2-8 | 0.2 | ○ | 90 | 10 | 1.97 | ○ | ○ | 1.95 | ○ |
| Comp. Ex. 2-9 | 0.2 | ○ | 0 | 100 | 2.51 | ○ | X | 2.49 | ○ |
| Comp. Ex. 2-10 | 0.2 | ○ | 100 | 0 | 2.52 | ○ | ○ | 2.50 | ○ |

TABLE 3

| Gray Scale | 0 | 23/55 | 46/255 | 70/255 | 93/255 | 116/255 | 139/255 | 162/255 | 185/255 | 209/255 | 232/255 | 255/255 |
|---|---|---|---|---|---|---|---|---|---|---|---|---|
| Ex. 2-1 | 0.06 | 0.13 | 0.22 | 0.37 | 0.49 | 0.70 | 0.96 | 1.25 | 1.56 | 1.78 | 2.17 | 2.55 |
| Ex. 2-2 | 0.06 | 0.13 | 0.22 | 0.37 | 0.49 | 0.69 | 0.95 | 1.23 | 1.53 | 1.75 | 2.14 | 2.51 |
| Ex. 2-3 | 0.06 | 0.13 | 0.22 | 0.36 | 0.48 | 0.69 | 0.95 | 1.23 | 1.53 | 1.74 | 2.13 | 2.50 |
| Ex. 2-4 | 0.06 | 0.13 | 0.22 | 0.37 | 0.49 | 0.70 | 0.96 | 1.25 | 1.56 | 1.78 | 2.17 | 2.55 |
| Ex. 2-5 | 0.06 | 0.14 | 0.23 | 0.38 | 0.49 | 0.69 | 0.95 | 1.23 | 1.53 | 1.75 | 2.14 | 2.52 |
| Ex. 2-6 | 0.06 | 0.12 | 0.20 | 0.36 | 0.48 | 0.68 | 0.94 | 1.22 | 1.52 | 1.73 | 2.12 | 2.48 |
| Ex. 2-7 | 0.06 | 0.11 | 0.18 | 0.34 | 0.47 | 0.67 | 0.91 | 1.20 | 1.52 | 1.74 | 2.14 | 2.51 |
| Ex. 2-8 | 0.06 | 0.12 | 0.20 | 0.35 | 0.48 | 0.68 | 0.93 | 1.21 | 1.53 | 1.74 | 2.14 | 2.51 |
| Ex. 2-9 | 0.06 | 0.15 | 0.23 | 0.39 | 0.51 | 0.73 | 0.98 | 1.25 | 1.55 | 1.76 | 2.15 | 2.52 |
| Ex. 2-10 | 0.06 | 0.16 | 0.24 | 0.40 | 0.53 | 0.74 | 1.00 | 1.27 | 1.56 | 1.76 | 2.15 | 2.52 |
| Comp. Ex. 2-1 | 0.06 | 0.14 | 0.23 | 0.38 | 0.47 | 0.64 | 0.87 | 1.12 | 1.39 | 1.57 | 1.78 | 1.85 |
| Comp. Ex. 2-2 | 0.06 | 0.14 | 0.23 | 0.38 | 0.47 | 0.64 | 0.87 | 1.12 | 1.39 | 1.57 | 1.78 | 1.85 |
| Comp. Ex. 2-3 | 0.06 | 0.13 | 0.22 | 0.37 | 0.48 | 0.68 | 0.93 | 1.21 | 1.51 | 1.71 | 2.10 | 2.44 |
| Comp. Ex. 2-4 | 0.06 | 0.13 | 0.22 | 0.36 | 0.47 | 0.66 | 0.91 | 1.18 | 1.48 | 1.68 | 2.03 | 2.29 |
| Comp. Ex. 2-5 | 0.06 | 0.13 | 0.22 | 0.36 | 0.47 | 0.65 | 0.89 | 1.16 | 1.45 | 1.65 | 1.97 | 2.16 |
| Comp. Ex. 2-6 | 0.06 | 0.13 | 0.22 | 0.36 | 0.47 | 0.66 | 0.91 | 1.18 | 1.47 | 1.67 | 2.01 | 2.28 |
| Comp. Ex. 2-7 | 0.06 | 0.13 | 0.22 | 0.36 | 0.47 | 0.65 | 0.89 | 1.17 | 1.46 | 1.66 | 1.98 | 2.19 |
| Comp. Ex. 2-8 | 0.06 | 0.13 | 0.22 | 0.36 | 0.47 | 0.65 | 0.88 | 1.14 | 1.42 | 1.61 | 1.82 | 1.97 |
| Comp. Ex. 2-9 | 0.07 | 0.17 | 0.25 | 0.41 | 0.54 | 0.75 | 1.01 | 1.28 | 1.56 | 1.76 | 2.15 | 2.51 |
| Comp. Ex. 2-10 | 0.06 | 0.09 | 0.16 | 0.32 | 0.43 | 0.63 | 0.89 | 1.18 | 1.51 | 1.73 | 2.12 | 2.52 |

In the results of Table 2, when the thermal transfer recording mediums of Examples 2-1 to 2-10 in which the undercoat layer was provided were compared to the thermal transfer recording mediums of Comparative Examples 2-1 and 2-2 in which the undercoat layer was not provided, the transfer sensitivity in a high-density portion during high-speed printing was clearly higher.

In addition, when Example 2-1 was compared to Comparative Examples 2-1, 2-2, and 2-5, in the absence of polyvinyl alcohol, a difference in the transfer density of a high-density portion between the anthraquinone-based dye and the other dyes was not shown. However, in the presence of polyvinyl alcohol, a difference in transfer density between the anthraquinone-based dye and the other dyes was shown. It was found from this result that polyvinyl alcohol had an effect of improving transfer sensitivity on the anthraquinone-based dye.

Further, when Comparative Example 2-8 containing polyvinyl pyrrolidone was compared to the examples containing polyvinyl alcohol, deterioration in adhesion after storage in a high-temperature and high-humidity environment was not shown. However, it was found that the transfer sensitivity in a high-density portion was low.

In addition, in Example 2-1 and Comparative Example 2-3, when a polyvinyl alcohol having a crystallinity degree of 10% was used for the undercoat layer, abnormal transfer was observed after storage in a high-temperature and high-humidity environment. However, it was found that, when a polyvinyl alcohol having a crystallinity degree of 25% was used for the undercoat layer, abnormal transfer was observed to a small degree but was greatly improved.

Further, in Example 2-2 and Comparative Example 2-4, it was found that, in the presence of polyvinyl pyrrolidone, the adhesion after storage in a high-temperature and high-humidity environment was improved and abnormal transfer was suppressed. In Examples 2-2 to 2-4 in which polyvinyl alcohols having crystallinity degrees of 15%, 25%, and 37% were used, respectively, abnormal transfer was not observed. On the other hand, in Comparative Example 2-4 in which a polyvinyl alcohol having a crystallinity degree of 10% was used, abnormal transfer was still observed. Further, in Examples 2-1 to 2-4 and Comparative Examples 2-3 and 2-4, when the crystallinity degree of polyvinyl alcohol was higher than or equal to 15%, the transfer density was not greatly decreased by the addition of polyvinyl pyrrolidone; however, when the crystallinity degree of polyvinyl alcohol was less than 15%, the transfer density was greatly decreased. It was found that from the results that the crystallinity degree of polyvinyl alcohol was necessarily higher than or equal to 15%.

In addition, when the thermal transfer recording medium of Example 2-5 was compared to the thermal transfer recording medium of Example 2-2, it was found that the adhesion after storage in a high-temperature and high-humidity was decreased to some extent because the coating amount of the undercoat layer was less than 0.05 g/m².

In addition, when the thermal transfer recording medium of Example 2-6 was also compared to the thermal transfer recording medium of Example 2-2, it was found that the effect of improving the transfer sensitivity was decreased because the coating amount of the undercoat layer was greater than 0.30 g/m².

It was found from the results of Tables 2 and 3 that the transfer sensitivity in a low-density portion during high-speed printing was higher when the thermal transfer recording mediums of Examples 2-1 to 2-10 in which the dye layer contained a polyvinyl acetal resin having a glass transition temperature of 100° C. or higher and a polyvinyl butyral resin having a glass transition temperature of 75° C. or lower were compared to Comparative Examples 2-9 and 2-10 in which the dye layer did not contain a polyvinyl acetal resin having a glass transition temperature of 100° C. or higher and a polyvinyl butyral resin having a glass transition temperature of 75° C. or lower.

In addition, when Examples 2-2 and 2-8 to 2-10 were compared to Comparative Examples 2-9 and 2-10, it was found that, when the dye layer did not contain a polyvinyl butyral resin having a glass transition temperature of 75° C. or lower, the color density in a low-density portion was insufficient. In addition, it was found that, when the mass content ratio of the polyvinyl acetal resin having a glass transition temperature of 100° C. or higher to the polyvinyl butyral resin having a glass transition temperature of 75° C. or lower was 98/2, an effect of increasing the color density in a low-density portion was obtained but small. The higher the content ratio of the polyvinyl butyral resin having a glass transition temperature of 75° C. or lower, the higher the transfer sensitivity in a low-density portion. It was found from the result of Comparative Example 2-9 that, when only the polyvinyl butyral resin having a glass transition temperature of 75° C. or lower was used, wrinkling deteriorated.

As described above, in the thermal transfer recording medium 2 according to the second embodiment, the undercoat layer 20 contains a polyvinyl pyrrolidone and a polyvinyl alcohol having a crystallinity degree of 15% or higher as major components. In addition, the dye layer 30 contains a polyvinyl acetal resin having a glass transition temperature of 100° C. or higher, a polyvinyl butyral resin having a glass transition temperature of 75° C. or lower, and an anthraquinone-based thermal transfer dye. Therefore, the transfer sensitivity during high-speed printing is high in both a low-density portion and a high-density portion, that is, a high-density image can be obtained without increasing the amount of a dye used in the dye layer 30. Further, it is possible to provide a thermal transfer recording medium capable of preventing abnormal transfer during printing even after storage in a high-temperature and high-humidity environment.

Therefore, in the thermal transfer recording medium according to the second embodiment, the transfer sensitivity during high-speed printing is low in both a low-density portion and a high-density portion. As a result, it is possible to solve the problem that the amount of a dye used in a dye layer cannot be decreased. In addition, it is possible to solve the problem that abnormal transfer occurs during printing after storage in a high-temperature and high-humidity environment.

Third Embodiment

Hereinafter, a third embodiment of the thermal transfer recording medium according to the present invention will be described.

(Thermal Transfer Recording Medium)

The thermal transfer recording medium according to the third embodiment is a thermal transfer recording medium having the same structure as that of the thermal transfer recording medium 1 described in the first embodiment. That is, in the thermal transfer recording medium according to the third embodiment, as illustrated in FIG. 1, the heat-resistant sliding layer 40 is formed on one surface of the substrate 10, and the undercoat layer 20 and the dye layer 30 are sequentially laminated on the other surface of the substrate 10.

The third embodiment is different from the first embodiment mainly in that the heat-resistant sliding layer 40 has a different configuration, but the other configurations are the same. Accordingly, in the following description, only the above-described different configuration will be described, and the description of the same configurations will not be repeated.

<Heat-Resistant Sliding Layer>

In the heat-resistant sliding layer 40 according to the third embodiment, an average value of a surface roughness Ra of the heat-resistant sliding layer 40 before being left to stand in an environment of 150° C. is in a range of 0.05 to 0.50. Further, in the heat-resistant sliding layer 40, an average value of a surface roughness Ra of the heat-resistant sliding layer 40 after being left to stand in an environment of 150° C. for 10 minutes is in a range of 0.00 to 0.80. Furthermore, in the heat-resistant sliding layer 40, an absolute value of a difference between the average values of the surface roughnesses Ra of the heat-resistant sliding layer 40 before and after being left to stand in an environment of 150° C. for 10 minutes is in a range of 0.00 to 0.30.

By providing a certain amount of convex and concave portions on the heat-resistant sliding layer 40, the contact area between the heat-resistant sliding layer 40 and a thermal head is decreased, the friction therebetween is decreased to obtain a sliding property, and thus printing defects can be prevented. Therefore, when the surface roughness Ra of the heat-resistant sliding layer 40 is lower than 0.05, the surface is close to the smooth state, the friction with a thermal head is increase, printing defects occur. However, when the surface roughness Ra of the heat-resistant sliding layer 40 is greater than 0.50, the amount of convex and concave portions is excessively increased, and non-uniformity occurs in heat conduction from a thermal head, which leads to density non-uniformity on printed materials.

In addition, when a certain amount of convex and concave portions can be maintained during both low-energy printing and high-energy printing, a stable sliding property can be obtained during both low-energy printing and high-energy printing. Accordingly, even if an image portion and a non-image portion are present on the same image, there is no difference in sliding property therebetween, and wrinkling can be suppressed. Accordingly, when an average value of a surface roughness Ra of the heat-resistant sliding layer 40 after being left to stand in an environment of 150° C. for 10 minutes is in a range of 0.00 to 0.80 and when an absolute value of a difference between the average values of the surface roughnesses Ra of the heat-resistant sliding layer 40 before and after being left to stand in an environment of 150° C. for 10 minutes is in a range of 0.00 to 0.30, there is no significant difference in the amount of convex and concave portions on the surface between low-energy printing and high-energy printing, and thus wrinkling can be prevented.

Even in a case where the surface roughness Ra of the heat-resistant sliding layer 40 before being left to stand in an environment of 150° C. for 10 minutes is lower than or equal to 0.50, when the surface roughness Ra of the heat-resistant sliding layer 40 after being left to stand in an environment of 150° C. for 10 minutes is higher than 0.80, non-uniformity occurs in heat conduction from a thermal head during printing. In addition, an absolute value of a difference between the average values of the surface roughnesses Ra of the heat-resistant sliding layer 40 before and after being left to stand in an environment of 150° C. for 10 minutes is higher than 0.30.

When an absolute value of a difference between the average values of the surface roughnesses Ra of the heat-resistant sliding layer 40 before and after being left to stand in an environment of 150° C. for 10 minutes is higher than 0.30, there is a difference in friction and sliding property with a thermal head between low-energy printing and high-energy printing, and wrinkling is not prevented.

In order to satisfy the above-described range of the surface roughness, it is necessary that the amount of convex and concave portions of the heat-resistant sliding layer 40 be adjusted.

Therefore, it is preferable that the heat-resistant sliding layer 40 according to the third embodiment contain inorganic particles, for example, for providing a certain amount of convex and concave portions on the surface to adjust a sliding property.

By the heat-resistant sliding layer 40 containing the inorganic particles, convex and concave portions are formed on the surface thereof, the contact area with a thermal head is decreased. Therefore, the friction with the thermal head is decreased, and a sliding property is improved. In addition, the inorganic particles barely changes due to heat. Therefore, even when printing is performed with high-energy, a certain amount of convex and concave portions can be maintained, and thus a certain level of sliding property can be obtained during both low-energy printing and high-energy printing. That is, the inorganic particles have stable heat resistance and thus can prevent wrinkling during printing. Further, by the heat-resistant sliding layer 40 containing the inorganic particles, a property of cleaning a thermal head can be imparted thereto.

[Inorganic Particles]

The inorganic particles are used for adjusting the amount of convex and concave portions of the heat-resistant sliding layer 40. In addition, two kinds of inorganic particles having different average particle sizes may be used in combination, and this combination is appropriately selected. The average particle size of the inorganic particles varies depending on the thickness of the heat-resistant sliding layer 40 to be formed and is not particularly limited. However, the average particle size of the inorganic particles is preferably in a range of 0.1 μm to 6 μm and more preferably in a range of 0.5 μm to 4 μm. When the average particle size of the inorganic particles is less than 0.1 μm, the inorganic particles are buried in the heat-resistant sliding layer 40 and cannot form convex and concave portions. As a result, there is a risk that the friction with a thermal head cannot be decreased or a risk that the property of cleaning a thermal head may be decreased.

In addition, when the average particle size of the inorganic particles is greater than 6 μm, the amount of convex and concave portions of the heat-resistant sliding layer 40 is excessively increased. In some areas, there is a fear that heat from a thermal head is not sufficiently conducted thereto, non-uniformity appears in a printing material and the inorganic particles are desorbed from the heat-resistant sliding layer 40, which may cause scratches or the like on a printing surface.

In order to adjust the amount of convex and concave portions, one kind of inorganic particles may be used alone, or a mixture of two or more kinds of inorganic particles may be used. In this case, it is preferable that the inorganic particles not be deformed by heat from a thermal head. Specific examples of the inorganic particles include silica particles, magnesium oxide, zinc oxide, calcium carbonate, magnesium carbonate, talc, kaolin, and clay. In addition, the content of the inorganic particles is preferably in a range of 2 mass % to 30 mass % and more preferably in a range of 3 mass % to 20 mass %. When the content of the inorganic particles is less than 2 mass %, the effect of cleaning a thermal head is insufficient, and the value of the surface roughness Ra is decreased. When the content of the inorganic particles is greater than 30 mass %, some types of inorganic particles have a risk of decreasing the strength of the heat-resistant sliding layer itself. In addition, by the value of the surface roughness Ra being increased, non-uniformity occurs in heat conduction from a thermal head, and there is a risk of causing defects on printed materials.

[Lubricant]

The heat-resistant sliding layer 40 preferably contains a lubricant for improving a sliding property with a thermal head, and may contain a combination of two kinds of lubricants having different melting points. By the heat-resistant sliding layer 40 containing the lubricant, the lubricant is melted when being heated by heat from a thermal head, a sliding property is improved, and an effect of reducing a thermal load on the thermal transfer recording medium is obtained. In addition, by the heat-resistant sliding layer 40 containing the lubricants having different melting points, a stable sliding property can be imparted in any temperature range from a low temperature to a high temperature, that is, during both low-energy printing and high-energy printing.

Examples of the lubricant include natural waxes such as animal waxes or vegetable waxes; synthetic waxes such as synthetic hydrocarbon waxes, aliphatic alcohol-acid waxes, fatty acid ester-glyceride waxes, synthetic ketone waxes, amine-amide waxes, chlorinated hydrocarbon waxes, or α-olefin waxes; higher fatty acid esters such as butyl stearate or ethyl oleate; metal salts of higher fatty acids such as sodium stearate, zinc stearate, calcium stearate, potassium stearate, or magnesium stearate; and surfactants of phosphoric acid esters such as long-chain alkyl phosphoric acid esters, polyoxyalkylene alkyl aryl ether phosphoric acid esters, or polyoxyalkylene alkyl ether phosphoric acid esters.

In addition, the total content of the lubricant in the heat-resistant sliding layer 40 is preferably in a range of 5 mass % to 25 mass % with respect to the heat-resistant sliding layer 40. When the content of the lubricant is less than 5 mass %, a sliding property is not sufficiently exhibited, and there is a risk that some images may be bonded to a thermal head due to insufficient lubricant. In addition, when the content of the lubricant is greater than 25 mass %, a sliding property is imparted more than necessary, and there is a risk that a melted lubricant may affect an image.

[Binder, Cross-Linking Agent]

The heat-resistant sliding layer 40 is provided for providing the substrate 10 from being thermally shrunk by heat from a thermal head or from being damaged by the friction with a thermal head. Examples of a binder used for the heat-resistant sliding layer 40 include cellulose resins, polyester resins, acrylic resins, vinyl resins, polyurethane resins, polyether resins, polycarbonate resins, and acetal resins.

In addition, in order to improve heat-resistance, a cross-linking agent is also used for the heat-resistant sliding layer 40. By the heat-resistant sliding layer 40 containing the cross-linking agent, the heat resistance thereof is improved, and the substrate 10 can be prevented from being deformed by the friction with a thermal head. As the cross-linking agent, for example, polyisocyanates may be used, and examples thereof include acrylic-, urethane-, and polyester-polyol resins, cellulose resins, and acetal resins.

[Coating Amount of Heat-Resistant Sliding Layer After Drying]

The coating amount of the heat-resistant sliding layer 40 after drying is preferably in a range of 0.2 g/m² to 2.6 g/m² and more preferably in a range of 0.6 g/m² to 1.6 g/m². When the thickness of the heat-resistant sliding layer 40 is less than 0.2 g/m², heat resistance is poor, and thermal shrinkage is likely to occur during printing. On the other hand, when the thickness of the heat-resistant sliding layer 40 is greater than 2.6 g/m², heat is not sufficiently conducted from a thermal head to the dye layer 30, and a printed material having a desired density cannot be obtained.

[Method of Measuring Surface Roughness Ra]

As a method of measuring the surface roughness Ra, a contact method and a non-contact method can be used. In the third embodiment, the surface roughness Ra is measured using a non-contact laser microscope.

"Surface Roughness Ra" in the third embodiment represents a center line average roughness corresponding to Ra of JIS. When a portion of a measured length L is cut out from a roughness curve in the center line direction thereof, the center line of cut-out portion is the X-axis, the longitudinal magnification direction is the Y-axis, and the roughness curve is represented by "y=f(x)", the surface roughness Ra is a value obtained by the following expression.

$$Ra = 1/L \int_0^L |f(x)| dx \qquad \text{[Expression 1]}$$

For the measurement, a scanning confocal laser microscope OLS1100 (manufactured by Olympus Corporation) was used. In the case of the measurement using a laser microscope, the resolution power depends on the numerical aperture of an objective lens, and thus a 100× objective lens with the highest numerical aperture was selected A measured image is divided into 11 portions in the Y-axis direction, and the surface roughness Ra is measured at each boundary between the divided portions at a cut-off value of ⅓ of the measurement length in the X-axis direction.

Hereinafter, materials used in Examples of the third embodiment and Comparative Examples will be described. Unless specified otherwise, "part(s)" in the following description represents "part(s) by mass".

(Preparation of Polyvinyl Alcohol (PVA))

The preparation of a PVA resin in the third embodiment is the same as (Preparation of Polyvinyl Alcohol (PVA) Resin) described in the first embodiment. Accordingly, the description of the preparation of the PVA resin in the third embodiment will not be repeated.

[Method of Measuring Surface Roughness Ra]

Regarding "Surface Roughness Ra" in the third embodiment, the surface roughness Ra of the heat-resistant sliding layer of the thermal transfer recording medium is measured 10 times using a scanning confocal laser microscope OLS1100 (manufactured by Olympus Corporation) before being left to stand in an environment of 150° C., and the average value thereof is obtained. Further, after being left to stand in an environment of 150° C. for 10 minutes, the surface roughness Ra is measured in the same method, and the average value thereof is obtained. Then, a difference between the average values is obtained.

Example 3-1

As a substrate, a 4.5 μm-thick polyethylene terephthalate film with a single surface subjected to an adhesion treatment was used. A heat-resistant sliding layer-forming coating solution 3-1 having the following composition was coated on a surface of the substrate which was not subjected to an adhesion treatment using a gravure coating method such that the coating amount thereof after drying was 1.0 g/m², followed by drying. Next, after aging in an environment of 40° C. for 1 week, an undercoat layer-forming coating solution 3-1 having the following composition was coated on the adhesion treatment-subjected surface of the substrate using a gravure coating method such that the coating amount thereof after drying was 0.20 g/m². Next, by drying the substrate at 100° C. for 2 minutes, an undercoat layer was formed. Next, a dye layer-forming coating solution 3-1 having the following composition was coated on the undercoat layer using a gravure coating method such that the coating amount thereof after drying was 0.70 g/m². Next, by drying the substrate at 90° C. for 1 minute, a dye layer was formed. As a result, a thermal transfer recording medium of Example 3-1 was obtained.

<Heat-Resistant Sliding Layer-Forming Coating Solution 3-1>

| | |
|---|---|
| Acrylic polyol resin (solid content: 50%) | 20 parts |
| Phosphoric acid ester (melting point: 15° C.) | 1 part |
| Phosphoric acid ester (melting point: 70° C.) | 1 part |
| Talc (particle size: 2.5 μm) | 4 parts |
| 2.6-tolylene diisocyanate prepolymer | 5 parts |
| Toluene | 54 parts |
| Methyl ethyl ketone | 20 parts |
| Ethyl acetate | 5 parts |

<Undercoat Layer-Forming Coating Solution 3-1>

| | |
|---|---|
| Polyvinyl alcohol (crystallinity degree: 25%) | 5.0 parts |
| Pure water | 57.0 parts |
| Isopropyl alcohol | 38.0 parts |

<Dye Layer-Forming Coating Solution 3-1>

| | |
|---|---|
| C.I. solvent blue 63 (anthraquinone-based dye) | 6.0 parts |
| Polyvinyl acetal resin | 4.0 parts |
| Toluene | 45.0 parts |
| Methyl ethyl ketone | 45.0 parts |

Example 3-2

A thermal transfer recording medium of Example 3-2 was obtained with the same method as that of Example 3-1, except that, in the thermal transfer recording medium prepared in Example 3-1, the heat-resistant sliding layer-forming coating solution was changed to a heat-resistant sliding layer-forming coating solution 3-2 having the following composition.

<Heat-Resistant Sliding Layer-Forming Coating Solution 3-2>

| | |
|---|---|
| Acrylic polyol resin (solid content: 50%) | 20 parts |
| Phosphoric acid ester (melting point: 15° C.) | 2 parts |
| Phosphoric acid ester (melting point: 70° C.) | 1.5 parts |
| Zinc stearate (melting point: 115° C. to 125° C.) | 1.5 parts |
| Talc (particle size: 1.0 μm) | 1 part |
| Talc (particle size: 2.5 μm) | 4 parts |
| 2.6-tolylene diisocyanate prepolymer | 5 parts |
| Toluene | 49.5 parts |
| Methyl ethyl ketone | 20 parts |
| Ethyl acetate | 5 parts |

Example 3-3

A thermal transfer recording medium of Example 3-3 was obtained with the same method as that of Example 3-1, except that, in the thermal transfer recording medium prepared in Example 3-1, the heat-resistant sliding layer-forming coating solution was changed to a heat-resistant sliding layer-forming coating solution 3-3 having the following composition.
<Heat-Resistant Sliding Layer-Forming Coating Solution 3-3>

| | |
|---|---|
| Acrylic polyol resin (solid content: 50%) | 20 parts |
| Phosphoric acid ester (melting point: 15° C.) | 0.5 parts |
| Phosphoric acid ester (melting point: 70° C.) | 0.5 parts |
| Magnesium oxide (particle size: 0.8 μm) | 1 part |
| Talc (particle size: 2.5 μm) | 1 parts |
| 2.6-tolylene diisocyanate prepolymer | 5 parts |
| Toluene | 47.5 parts |
| Methyl ethyl ketone | 20 parts |
| Ethyl acetate | 5 parts |

Example 3-4

A thermal transfer recording medium of Example 3-4 was obtained with the same method as that of Example 3-1, except that, in the thermal transfer recording medium prepared in Example 3-1, the heat-resistant sliding layer-forming coating solution was changed to a heat-resistant sliding layer-forming coating solution 3-4 having the following composition.
<Heat-Resistant Sliding Layer-Forming Coating Solution 3-4>

| | |
|---|---|
| Acrylic polyol resin (solid content: 50%) | 20 parts |
| Phosphoric acid ester (melting point: 15° C.) | 2 parts |
| Phosphoric acid ester (melting point: 70° C.) | 2 parts |
| Zinc stearate (melting point: 115° C. to 125° C.) | 2 parts |
| Talc (particle size: 2.5 μm) | 5 parts |
| Talc (particle size: 3.5 μm) | 1 part |
| 2.6-tolylene diisocyanate prepolymer | 5 parts |
| Toluene | 46 parts |
| Methyl ethyl ketone | 20 parts |
| Ethyl acetate | 5 parts |

Example 3-5

A thermal transfer recording medium of Example 3-5 was obtained with the same method as that of Example 3-2, except that, in the thermal transfer recording medium prepared in Example 3-2, the heat-resistant sliding layer-forming coating solution did not contain inorganic particles.

Example 3-6

A thermal transfer recording medium of Example 3-6 was obtained with the same method as that of Example 3-1, except that, in the thermal transfer recording medium prepared in Example 3-1, the undercoat layer-forming coating solution was changed to an undercoat layer-forming coating solution 3-2 having the following composition.
<Undercoat Layer-Forming Coating Solution 3-2>

| | |
|---|---|
| Polyvinyl alcohol (crystallinity degree: 25%) | 1.8 parts |
| Polyvinyl pyrrolidone | 1.8 parts |
| Pure water | 57.0 parts |
| Isopropyl alcohol | 39.4 parts |

Example 3-7

A thermal transfer recording medium of Example 3-7 was obtained with the same method as that of Example 3-1, except that, in the thermal transfer recording medium prepared in Example 3-1, the undercoat layer-forming coating solution was changed to an undercoat layer-forming coating solution 3-3 having the following composition.
<Undercoat Layer-Forming Coating Solution 3-3>

| | |
|---|---|
| Polyvinyl alcohol (crystallinity degree: 15%) | 1.8 parts |
| Polyvinyl pyrrolidone | 1.8 parts |
| Pure water | 57.0 parts |
| Isopropyl alcohol | 39.4 parts |

Example 3-8

A thermal transfer recording medium of Example 3-8 was obtained with the same method as that of Example 3-1, except that, in the thermal transfer recording medium prepared in Example 3-1, the undercoat layer-forming coating solution was changed to an undercoat layer-forming coating solution 3-4 having the following composition.
<Undercoat Layer-Forming Coating Solution 3-4>

| | |
|---|---|
| Polyvinyl alcohol (crystallinity degree: 37%) | 1.8 parts |
| Polyvinyl pyrrolidone | 1.8 parts |
| Pure water | 57.0 parts |
| Isopropyl alcohol | 39.4 parts |

Example 3-9

A thermal transfer recording medium of Example 3-9 was obtained with the same method as that of Example 3-1, except that, in the thermal transfer recording medium prepared in Example 3-6, the undercoat layer was formed by coating and drying such that the coating amount thereof after drying was 0.03 g/m².

Example 3-10

A thermal transfer recording medium of Example 3-10 was obtained with the same method as that of Example 3-1, except mthat, in the thermal transfer recording medium prepared in Example 3-6, the undercoat layer was formed by coating and drying such that the coating amount thereof after drying was 0.35 g/m².

Comparative Example 3-1

A thermal transfer recording medium of Comparative Example 3-12 was obtained with the same method as that of Example 3-1, except that, in the thermal transfer recording medium prepared in Example 3-1, the heat-resistant sliding layer-forming coating solution was changed to a heat-resistant sliding layer-forming coating solution 3-5 having the following composition.

<Heat-Resistant Sliding Layer-Forming Coating Solution 3-5>

| | |
|---|---|
| Acrylic polyol resin (solid content: 50%) | 20 parts |
| Zinc stearate (melting point: 115° C. to 125° C.) | 1 part |
| Talc (particle size: 0.6 μm) | 1.5 parts |
| 2.6-tolylene diisocyanate prepolymer | 5 parts |
| Toluene | 49.5 parts |
| Methyl ethyl ketone | 20 parts |
| Ethyl acetate | 5 parts |

Comparative Example 3-2

A thermal transfer recording medium of Comparative Example 3-2 was obtained with the same method as that of Example 3-1, except that, in the thermal transfer recording medium prepared in Example 3-1, the heat-resistant sliding layer-forming coating solution was changed to a heat-resistant sliding layer-forming coating solution 3-6 having the following composition.

<Heat-Resistant Sliding Layer-Forming Coating Solution 3-6>

| | |
|---|---|
| Acrylic polyol resin (solid content: 50%) | 20 parts |
| Phosphoric acid ester (melting point: 15° C.) | 3 parts |
| Phosphoric acid ester (melting point: 70° C.) | 1.5 parts |
| Zinc stearate (melting point: 115° C. to 125° C.) | 1.5 parts |
| Magnesium oxide (particle size: 0.5 μm) | 0.5 part |
| Talc (particle size: 1.0 μm) | 1.5 parts |
| Talc (particle size: 2.5 μm) | 2 parts |
| 2.6-tolylene diisocyanate prepolymer | 5 parts |
| Toluene | 49.5 parts |
| Methyl ethyl ketone | 20 parts |
| Ethyl acetate | 5 parts |

Comparative Example 3-3

A thermal transfer recording medium of Comparative Example 3-3 was obtained with the same method as that of Example 3-1, except that, in the thermal transfer recording medium prepared in Example 3-1, the heat-resistant sliding layer-forming coating solution was changed to a heat-resistant sliding layer-forming coating solution 3-7 having the following composition.

<Heat-Resistant Sliding Layer-Forming Coating Solution 3-7>

| | |
|---|---|
| Acrylic polyol resin (solid content: 50%) | 20 parts |
| Phosphoric acid ester (melting point: 15° C.) | 2 parts |
| Phosphoric acid ester (melting point: 70° C.) | 1 part |
| Magnesium stearate (melting point: about 155° C.) | 1 part |
| Talc (particle size: 1.0 μm) | 3 parts |
| Talc (particle size: 2.5 μm) | 4 parts |
| 2.6-tolylene diisocyanate prepolymer | 5 parts |
| Toluene | 49.5 parts |
| Methyl ethyl ketone | 20 parts |
| Ethyl acetate | 5 parts |

Comparative Example 3-4

A thermal transfer recording medium of Comparative Example 3-4 was obtained with the same method as that of Example 3-1, except that, in the thermal transfer recording medium prepared in Example 3-1, the heat-resistant sliding layer-forming coating solution was changed to a heat-resistant sliding layer-forming coating solution 3-8 having the following composition.

<Heat-Resistant Sliding Layer-Forming Coating Solution 3-8>

| | |
|---|---|
| Acrylic polyol resin (solid content: 50%) | 20 parts |
| Phosphoric acid ester (melting point: 15° C.) | 3 parts |
| Phosphoric acid ester (melting point: 70° C.) | 2 parts |
| Zinc stearate (melting point: 115° C. to 125° C.) | 2 parts |
| Talc (particle size: 2.5 μm) | 6 parts |
| Talc (particle size: 3.3 μm) | 2 parts |
| 2.6-tolylene diisocyanate prepolymer | 5 parts |
| Toluene | 49.5 parts |
| Methyl ethyl ketone | 20 parts |
| Ethyl acetate | 5 parts |

Comparative Example 3-5

The same dye layer-forming coating solution as that of Example 3-1 was coated on the adhesion treatment-subjected surface of the heat-resistant sliding layer-provided substrate using a gravure coating method without forming an undercoat layer thereon such that the coating amount thereof after drying was 0.70 g/m². Next, by drying the substrate at 90° C. for 1 minute, a dye layer was formed. As a result, a thermal transfer recording medium of Comparative Example 3-5 was obtained.

Comparative Example 3-6

A dye layer-forming coating solution 3-2 having the following composition was coated on the adhesion treatment-subjected surface of the heat-resistant sliding layer-provided substrate using a gravure coating method without forming an undercoat layer thereon such that the coating amount thereof after drying was 0.70 g/m². Next, by drying the substrate at 90° C. for 1 minute, a dye layer was formed. As a result, a thermal transfer recording medium of Comparative Example 3-6 was obtained.

<Dye Layer-Forming Coating Solution 3-2>

| | |
|---|---|
| C.I. solvent blue 266 (azo-based dye) | 3.0 parts |
| Polyvinyl acetal resin | 2.0 parts |
| Toluene | 47.5 parts |
| Methyl ethyl ketone | 47.5 parts |

Comparative Example 3-7

A thermal transfer recording medium of Comparative Example 3-7 was obtained with the same method as that of Example 3-1, except that, in the thermal transfer recording medium prepared in Example 3-1, the undercoat layer-forming coating solution was changed to an undercoat layer-forming coating solution 3-5 having the following composition.

<Undercoat Layer-Forming Coating Solution 3-5>

| Polyvinyl alcohol (crystallinity degree: 10%) | 5.0 parts |
|---|---|
| Pure water | 57.0 parts |
| Isopropyl alcohol | 38.0 parts |

Comparative Example 3-8

A thermal transfer recording medium of Comparative Example 3-8 was obtained with the same method as that of Example 3-1, except that, in the thermal transfer recording medium prepared in Example 3-1, the undercoat layer-forming coating solution was changed to an undercoat layer-forming coating solution 3-6 having the following composition.

<Undercoat Layer-Forming Coating Solution 3-6>

| Polyvinyl alcohol (crystallinity degree: 10%) | 1.8 parts |
|---|---|
| Polyvinyl pyrrolidone | 1.8 parts |
| Pure water | 57.0 parts |
| Isopropyl alcohol | 38.5 parts |

Comparative Example 3-9

A thermal transfer recording medium of Comparative Example 3-9 was obtained with the same method as that of Example 3-1, except that, in the thermal transfer recording medium prepared in Comparative Example 3-7, the dye layer-forming coating solution was changed to a dye layer-forming coating solution 3-3 having the following composition.

Comparative Example 3-10

A thermal transfer recording medium of Comparative Example 3-10 was obtained with the same method as that of Example 3-1, except that, in the thermal transfer recording medium prepared in Example 3-1, the dye layer-forming coating solution was changed to the dye layer-forming coating solution 3-3.

<Dye Layer-Forming Coating Solution 3-3>

| C.I. solvent blue 266 (azo-based dye) | 6.0 parts |
|---|---|
| Polyvinyl acetal resin | 4.0 parts |
| Toluene | 45.0 parts |
| Methyl ethyl ketone | 45.0 parts |

Comparative Example 3-11

A thermal transfer recording medium of Comparative Example 3-11 was obtained with the same method as that of Example 3-1, except that, in the thermal transfer recording medium prepared in Example 3-2, the dye layer-forming coating solution was changed to the dye layer-forming coating solution 3-3.

Comparative Example 3-12

A thermal transfer recording medium of Comparative Example 3-12 was obtained with the same method as that of Example 3-1, except that, in the thermal transfer recording medium prepared in Example 3-1, the undercoat layer-forming coating solution was changed to an undercoat layer-forming coating solution 3-7 having the following composition.

<Undercoat Layer-Forming Coating Solution 3-7>

| Polyvinyl pyrrolidone | 5.0 parts |
|---|---|
| Pure water | 57.0 parts |
| Isopropyl alcohol | 38.0 parts |

(Preparation of Transfer Medium 3)

As a substrate, a 188 μm-thick white foaming polyethylene terephthalate film was used. An image-receiving layer-forming coating solution 3 having the following composition was coated on one surface of the substrate using a gravure coating method such that the coating amount thereof after drying was 5.0 g/m², followed by drying. As a result, a transfer medium 3 for thermal transfer was prepared.

<Image-Receiving Layer-Forming Coating Solution 3>

The image-receiving layer-forming coating solution 3 in the third embodiment is the same as <Image-Receiving Layer-Forming Coating Solution 1> described in the first embodiment. Accordingly, the description of the image-receiving layer-forming coating solution 3 in the third embodiment will not be repeated.

<Adhesion Evaluation of Dye Layer at Room Temperature>

Regarding the thermal transfer recording mediums of Examples 3-1 to 3-10 and Comparative Examples 3-1 to 3-12, a cellophane tape having a width of 18 mm and a length of 150 mm was attached on the dye layer of the thermal transfer recording medium stored at room temperature. Next, when the tape was immediately detached, whether or not the attachment of the dye layer on the cellophane tape side was observed was investigated for the evaluation, and the results thereof are shown in Table 4.

The criteria of the adhesion evaluation in the third embodiment are the same as those of <Adhesion Evaluation of Dye Layer at Room Temperature> described in the first embodiment. Accordingly, the description of the criteria of the adhesion evaluation in the third embodiment will not be repeated.

<Printing Evaluation>

Regarding the thermal transfer recording mediums of Examples 3-1 to 3-10 and Comparative Examples 3-1 to 3-12, a printing evaluation was performed using the thermal transfer recording medium stored at room temperature, the thermal transfer recording medium stored in an environment of 40° C. and 90% RH for 72 hours and further stored at room temperature for 24 hours, and the transfer medium 3. By printing solid images using a thermal simulator, a maximum reflection density, whether or not abnormal transfer was observed, and tint non-uniformity were investigated for the evaluation, and the results thereof are shown in Table 4. "Maximum reflection density" in Table 4 which is an index indicating "transfer sensitivity (transfer density)" is a value obtained by measuring printed materials during high-energy printing with a spectrodensitometer "528" (manufactured by X-Rite inc.). In addition, the printing conditions in the third embodiment are the same as those in <Printing Evaluation> described in the first embodiment. Accordingly, the description of the printing conditions in the third embodiment will not be repeated.

<Abnormal Transfer Evaluation>

Abnormal transfer was evaluated based on the following criteria. A or higher is a level at which there was practically no problem.

O: Abnormal transfer to the transfer medium 3 was not observed

ΔO: Abnormal transfer to the transfer medium 3 was observed to an extremely small degree Δ: Abnormal transfer to the transfer medium 3 was observed to a small degree X: Abnormal transfer to the transfer medium 3 was observed on the entire surface <Evaluation of Tint Non-Uniformity>

Tint non-uniformity was evaluated based on the following criteria.

◎: Tint non-uniformity was not observed
O: Tint non-uniformity was observed to a small degree
Δ: Tint non-uniformity was observed (slightly conspicuous)
X: Tint non-uniformity was observed (conspicuous)

<Evaluation of Print Wrinkling and Head Contamination>

Regarding the thermal transfer recording mediums of Examples 3-1 to 3-10 and Comparative Examples 3-1 to 3-12, in an environment of 35° C. and 80% RT, using a thermal simulator, a solid image pattern was printed on one surface of a sheet, and a white image pattern was printed on the other surface of the sheet. Then, whether or not wrinkling occurred on the obtained printed material was investigated. In addition, the amount of materials attached on a thermal head heating element was observed using a microscope.

Print wrinkling and head contamination were evaluated based on the following criteria.

[Print Wrinkling]

◎: Print wrinkling was not observed
O: Print wrinkling was observed to a very small degree
Δ: Print wrinkling was observed to a small degree
X: Print wrinkling was observed to a large degree

[Head Contamination]

O: No problem and satisfactory
Δ: No problem but slightly unsatisfactory
X: Problem occurred The results of each evaluation of the above-described Examples and Comparative Examples are shown in Table 4 below. In Table 4, "|Difference in Average Values before and after Standing at 150° C. for 10 Minutes|" represents "absolute value of a difference between the average values of the surface roughnesses Ra of the heat-resistant sliding layer before and after being left to stand in an environment of 150° C. for 10 minutes".

TABLE 4

| | | | | | | Printing Evaluation | | | | | |
|---|---|---|---|---|---|---|---|---|---|---|---|
| | Average Value of Ra | Average Value of Ra after Standing at 150° C. for 10 minutes | Difference of Average Values before and after Standing at 150° C. for 10 minutes | Coating Amount (g/m$^2$) of Undercoat Layer after Drying | Adhesion of Dye Layer at Room Temperature | Product Stored at Room Temperature | | Product Stored in High-Temperature and High-Humidity Environment (72 h) | | Tint Non-Uniformity | Print Wrinkling | Head Contamination |
| | | | | | | Maximum Reflection Density | Abnormal Transfer | Maximum Reflection Density | Abnormal Transfer | | | |
| Ex. 3-1 | 0.17 | 0.15 | 0.02 | 0.2 | O | 2.56 | O | 2.56 | ΔO | ◎ | ◎ | O |
| Ex. 3-2 | 0.29 | 0.19 | 0.10 | 0.2 | O | 2.56 | O | 2.54 | ΔO | ◎ | O | O |
| Ex. 3-3 | 0.08 | 0.06 | 0.02 | 0.2 | O | 2.57 | O | 2.56 | ΔO | ◎ | O | ◎ |
| Ex. 3-4 | 0.50 | 0.33 | 0.17 | 0.2 | O | 2.53 | O | 2.52 | ΔO | O | O | Δ |
| Ex. 3-5 | 0.12 | 0.02 | 0.10 | 0.2 | O | 2.56 | O | 2.56 | ΔO | ◎ | Δ | Δ |
| Ex. 3-6 | 0.17 | 0.15 | 0.02 | 0.2 | O | 2.52 | O | 2.5 | O | ◎ | ◎ | O |
| Ex. 3-7 | 0.17 | 0.15 | 0.02 | 0.2 | O | 2.51 | O | 2.49 | O | ◎ | ◎ | O |
| Ex. 3-8 | 0.17 | 0.15 | 0.02 | 0.2 | O | 2.56 | O | 2.54 | O | ◎ | ◎ | O |
| Ex. 3-9 | 0.17 | 0.15 | 0.02 | 0.03 | O | 2.54 | O | 2.52 | Δ | ◎ | ◎ | O |
| Ex. 3-10 | 0.17 | 0.15 | 0.02 | 0.35 | O | 2.49 | O | 2.47 | O | ◎ | ◎ | O |
| Comp. Ex. 3-1 | 0.03 | 0.04 | 0.01 | 0.2 | O | 2.57 | O | 2.56 | ΔO | ◎ | X | O |
| Comp. Ex. 3-2 | 0.35 | 0.04 | 0.31 | 0.2 | O | 2.56 | O | 2.55 | ΔO | O | X | Δ |
| Comp. Ex. 3-3 | 0.57 | 0.37 | 0.20 | 0.2 | O | 2.52 | O | 2.52 | ΔO | X | Δ | Δ |
| Comp. Ex. 3-4 | 0.65 | 0.31 | 0.34 | 0.2 | O | 2.52 | O | 2.51 | ΔO | X | X | X |
| Comp. Ex. 3-5 | 0.17 | 0.15 | 0.02 | — | — | 1.86 | O | 1.84 | O | ◎ | ◎ | O |
| Comp. Ex. 3-6 | 0.17 | 0.15 | 0.02 | — | — | 1.86 | O | 1.84 | O | ◎ | ◎ | O |

TABLE 4-continued

| | Average Value of Ra | Average Value of Ra after Standing at 150° C. for 10 minutes | Difference of Average Values before and after Standing at 150° C. for 10 minutes | Coating Amount (g/m²) of Undercoat Layer after Drying | Adhesion of Dye Layer at Room Temperature | Printing Evaluation | | | | | | |
|---|---|---|---|---|---|---|---|---|---|---|---|---|
| | | | | | | Product Stored at Room Temperature | | Product Stored in High-Temperature and High-Humidity Environment (72 h) | | Tint Non- | Print Wrink- | Head Con- |
| | | | | | | Maximum Reflection Density | Abnormal Transfer | Maximum Reflection Density | Abnormal Transfer | Uniform- ity | Wrink- ling | tamina- tion |
| Comp. Ex. 3-7 | 0.17 | 0.15 | 0.02 | 0.2 | ○ | 2.46 | Δ | Not able to be Measured | X | ◎ | ◎ | ○ |
| Comp. Ex. 3-8 | 0.17 | 0.15 | 0.02 | 0.2 | ○ | 2.3 | ○ | 2.31 | ○ | ◎ | ◎ | ○ |
| Comp. Ex. 3-9 | 0.17 | 0.15 | 0.02 | 0.2 | ○ | 2.17 | Δ | Not able to be Measured | X | ◎ | ◎ | ○ |
| Comp. Ex. 3-10 | 0.17 | 0.15 | 0.02 | 0.2 | ○ | 2.28 | ○ | 2.26 | Δ○ | ◎ | ◎ | ○ |
| Comp. Ex. 3-11 | 0.17 | 0.15 | 0.02 | 0.2 | ○ | 2.2 | ○ | 2.18 | ○ | ◎ | ◎ | ○ |
| Comp. Ex. 3-12 | 0.17 | 0.15 | 0.02 | 0.2 | ○ | 1.98 | ○ | 1.97 | ○ | ◎ | ◎ | ○ |

(Evaluation Result)

Among the results of Table 4, in the thermal transfer recording mediums of Example 3-1 to Example 3-10, printed materials having no problems in each evaluation item were able to be obtained.

When the compositions of the heat-resistant sliding layers in Examples 3-1 to 3-5 were investigated, it was found that the average value of the surface roughness Ra in each example (that is, the average value of the surface roughness Ra of the heat-resistant sliding layer before being left to stand in an environment of 150° C.) was in a range of 0.05 to 0.50, and the absolute value of a difference between the average values of the surface roughnesses Ra of the heat-resistant sliding layer before and after being left to stand in an environment of 150° C. for 10 minutes was in a range of 0.00 to 0.30. As a result, wrinkling was able to be suppressed during printing. It was able to be confirmed from the above results that, by decreasing a difference between the surface roughnesses Ra in a room-temperature environment and in a high-temperature environment, a certain amount of convex and concave portions was able to be maintained during both low-energy printing and high-energy printing, a difference in the friction of the heat-resistant sliding layer with a thermal head between low-energy printing and high-energy printing was decreased, and wrinkling was able to be prevented during printing.

In Example 3-4, it was found that tint non-uniformity was observed to a small degree and that the maximum reflection density was slightly decreased. The reason is presumed to be that, since the particle size and the content of talc were slightly greater than those of Examples 3-1 to 3-3, the value of the surface roughness Ra was high, and thus non-uniformity occurred in heat conduction to a small degree. When Example 3-5 not containing talc was compared to Example 3-2 containing talc, the surface roughness Ra was slightly low, and the absolute value of a difference between the average values of the surface roughnesses Ra of the heat-resistant sliding layer before and after being left to stand in an environment of 150° C. for 10 minutes was slightly large. That is, in Example 3-5, wrinkling was slightly conspicuous as compared to Example 3-2, and head contamination was observed. The reason is presumed to be that, in the absence of talc, only a small amount of convex and concave portions were formed on the surface by the lubricant. Further, the reason is presumed to be that, since the lubricant in the heat-resistant sliding layer was melted by applied heat, and the amount of convex and concave portions on the surface was decreased at once. Furthermore, the reason is presumed to be that, since talc had the effect of cleaning a head, head contamination became slightly severe.

In Comparative Example 3-1 in which the particle size of talc was small and the average value of the surface roughness Ra was small, tint non-uniformity was suppressed; however, wrinkling was observed to a large degree during printing, and printing defects caused by the bonding between the substrate and a thermal head were observed to a small degree. The reason is presumed to be that the amount of convex and concave portions was small, and thus tint non-uniformity was suppressed due to uniform heat conduction; however, the contact area with a thermal head was increased, and thus friction was increased.

In addition, in Comparative Example 3-2, there was no problem in the average value of the surface roughness Ra; however, the absolute value of a difference between the average values of the surface roughnesses Ra of the heat-resistant sliding layer before and after being left to stand in an environment of 150° C. for 10 minutes was large, and thus wrinkling occurred during printing. Further, in Comparative Example 3-3, tint non-uniformity was conspicuous due to the high value of the surface roughness Ra. In addition, in Comparative Example 3-4, the value of the surface roughness Ra was large, the absolute value of a difference between the average values of the surface roughnesses Ra of the heat-resistant sliding layer before and after being left to stand in an environment of 150° C. for 10 minutes was large, and thus wrinkling during printing and tint non-uniformity occurred.

When the thermal transfer recording mediums of Examples 3-1 to 3-10 in which the undercoat layer was provided were compared to the thermal transfer recording mediums of Comparative Examples 3-5 and 3-6 in which the undercoat layer was not provided, it was found that the transfer sensitivity during high-speed printing was clearly higher.

In addition, when Example 3-1 was compared to Comparative Examples 3-5, 3-6, and 3-9, in the absence of polyvinyl alcohol, a difference in transfer density between the anthraquinone-based dye and the other dyes was not shown. However, in the presence of polyvinyl alcohol, a difference in transfer density between the anthraquinone-based dye and the other dyes was shown. It was found from this result that polyvinyl alcohol had an effect of improving transfer sensitivity on the anthraquinone-based dye.

Further, when Comparative Example 3-12 containing polyvinyl pyrrolidone was compared to the examples containing polyvinyl alcohol, deterioration in adhesion after storage in a high-temperature and high-humidity environment was not shown. However, it was found that the transfer sensitivity was low.

In addition, in Example 3-1 and Comparative Example 3-7, when a polyvinyl alcohol having a crystallinity degree of 10% was used for the undercoat layer, abnormal transfer was observed after storage in a high-temperature and high-humidity environment. However, it was found that, when a polyvinyl alcohol having a crystallinity degree of 25% was used for the undercoat layer, abnormal transfer was observed to a small degree but was greatly improved.

Further, in Example 3-6 and Comparative Example 3-8, it was found that, in the presence of polyvinyl pyrrolidone, the adhesion after storage in a high-temperature and high-humidity environment was improved and abnormal transfer was suppressed. However, in Examples 3-6 to 3-8 in which polyvinyl alcohols having crystallinity degrees of 15%, 25%, and 37% were used, respectively, abnormal transfer was not observed. On the other hand, in Comparative Example 3-8 in which a polyvinyl alcohol having a crystallinity degree of 10% was used, abnormal transfer was still observed. Further, in Examples 3-1 and 3-6 to 3-8 and Comparative Examples 3-7 and 3-8, when the crystallinity degree of polyvinyl alcohol was higher than or equal to 15%, the transfer density was not greatly decreased by the addition of polyvinyl pyrrolidone; however, when the crystallinity degree of polyvinyl alcohol was less than 15%, the transfer density was greatly decreased. It was found that from the results that the crystallinity degree of polyvinyl alcohol was necessarily higher than or equal to 15%.

In addition, when the thermal transfer recording medium of Example 3-5 was compared to the thermal transfer recording medium of Example 3-6, it was found that the adhesion after storage in a high-temperature and high-humidity was decreased to some extent because the coating amount of the undercoat layer was less than 0.05 g/m².

In addition, when the thermal transfer recording medium of Example 3-10 was also compared to the thermal transfer recording medium of Example 3-6, it was found that the effect of improving the transfer sensitivity was decreased because the coating amount of the undercoat layer was greater than 0.30 g/m².

As described above, in the thermal transfer recording medium according to the third embodiment, the undercoat layer 20 contains a polyvinyl pyrrolidone and a polyvinyl alcohol having a crystallinity degree of 15% or higher as major components. In addition, the dye layer 30 contains an anthraquinone-based thermal transfer dye. Therefore, the transfer sensitivity during high-speed printing is high, that is, a high-density image can be obtained without increasing the amount of a dye used in the dye layer 30. Further, it is possible to provide a printed material capable of preventing abnormal transfer during printing even after storage in a high-temperature and high-humidity environment. In addition, in the heat-resistant sliding layer 40, an average value of a surface roughness Ra of the heat-resistant sliding layer 40 before being left to stand in an environment of 150° C. is in a range of 0.05 to 0.50. Further, in the heat-resistant sliding layer 40, an average value of a surface roughness Ra of the heat-resistant sliding layer 40 after being left to stand in an environment of 150° C. for 10 minutes is in a range of 0.00 to 0.80. Furthermore, in the heat-resistant sliding layer 40, an absolute value of a difference between the average values of the surface roughnesses Ra of the heat-resistant sliding layer 40 before and after being left to stand in an environment of 150° C. for 10 minutes is in a range of 0.00 to 0.30. As a result, even when the thickness of the dye layer 30 is decreased, wrinkling can be prevented during printing. Accordingly, it is possible to provide a thermal transfer recording medium capable of obtaining a clear image and preventing printing defects such as abnormal transfer or print wrinkling during high-speed printing.

Therefore, in the thermal transfer recording medium according to the third embodiment, the transfer sensitivity during high-speed printing is low. As a result, it is possible to solve the problem that the amount of a dye used in a dye layer cannot be decreased. In addition, it is possible to solve the problem that abnormal transfer occurs during printing after storage in a high-temperature and high-humidity environment. Further, it is possible to solve the problem that a stable image cannot be obtained due to print wrinkling.

Fourth Embodiment

Hereinafter, a fourth embodiment of the thermal transfer recording medium according to the present invention will be described.

(Thermal Transfer Recording Medium)

The thermal transfer recording medium according to the fourth embodiment is a thermal transfer recording medium having the same structure as that of the thermal transfer recording medium 1 described in the first embodiment. That is, in the thermal transfer recording medium according to the fourth embodiment, as illustrated in FIG. 1, the heat-resistant sliding layer 40 is formed on one surface of the substrate 10, and the undercoat layer 20 and the dye layer 30 are sequentially laminated on the other surface of the substrate 10.

The fourth embodiment is different from the first embodiment mainly in that the dye layer 30 has a different configuration, but the other configurations are the same. Accordingly, in the following description, only the above-described different configuration will be described, and the description of the same configurations will not be repeated.

<Dye Layer>

The dye layer 30 according to the fourth embodiment is a layer containing filler particles, and an anthraquinone-based thermal transfer dye. As a material of the dye layer 30, a well-known material of the related art can be used. For example, the dye layer 30 is a layer formed by mixing a thermal transfer dye, a binder, a solvent, and the like with each other to prepare a coating solution for forming a dye layer and performing coating and drying. The dye layer 30 may be a layer including a single layer of one color. In addition, the dye layer 30 may also be a layer in which plural dye layers containing different color dyes are sequentially and repeatedly formed on the same surface of the same substrate.

The thermal transfer dye of the fourth embodiment is the same as that of the first embodiment. Accordingly, the description of the thermal transfer dye in the fourth embodiment will not be repeated.

In addition, the binder of the fourth embodiment is the same as that of the first embodiment. Accordingly, the description of the binder in the fourth embodiment will not be repeated.

[Filler Particles]

The filler particles contained in the dye layer 30 are not particularly limited as long as the volume average particle size thereof is greater than 0.1 μm and less than 3.0 μm. For example, well-known materials such as synthetic resin fine particles or inorganic fine particles can be used.

By using the filler particles, convex and concave portions are provided on the surface of the dye layer 30, and the thermal fusion bonding of a water-based receiving layer and a thermal transfer image-receiving sheet can be prevented. As a result, tint non-uniformity in a high-density portion can be suppressed. It is necessary that a three-dimensional surface roughness SRa of the dye layer 30 be in a range of 0.15 μm to 0.70 μm. When the three-dimensional surface roughness SRa of the dye layer 30 is lower than 0.15 μm, the dye layer 30 is excessively flat, thermal fusion bonding occurs during printing, and there is a high risk that density non-uniformity may occur in a high-density portion. On the other hand, when the three-dimensional surface roughness SRa of the dye layer 30 is higher than 0.7 μm, thermal fusion bonding does not occur during printing, but there is a concern that the transfer sensitivity may deteriorate. Further, when the amount of the filler added is greater than the range, the strength of the dye layer 30 is decreased, and there is a high risk that abnormal transfer may occur.

The coating amount of the dye layer 30 after drying is approximately 0.7 $g/m^2$ to 1.0 $g/m^2$. Therefore, when filler particles having a volume average particle size of 3.0 μm or greater are used, the filler particles are likely to be separated from the dye layer 30, and the print density is decreased, which is not preferable. In addition, when filler particles having a volume average particle size of 0.1 μm or less are used, a necessary amount of convex and concave portions of the dye layer 30 are not obtained, which is not preferable.

Examples of synthetic resin fine particles which can be used include acrylic resin particles, silicone resin fine particles, fine particles of organic polymer compounds obtained by emulsion polymerization of vinyl monomers and the like, fine particles of organic polymer compounds obtained by polycondensation of polyesters, polyamides, polyimides, polybenzoxazoles, and the like, and fine particles of organic polymer compounds obtained by addition condensation of phenolic resins, melamine resins, and the like. Among these, silicone resin fine particles are preferable.

The inorganic fine particles are not particularly limited, and examples thereof include silica, alumina, titanium oxide, zirconium oxide, tin oxide, tungsten oxide, aluminum silicate (clay or kaolin), talc, attapulgite, sericite, mica, potassium titanate, barium titanate, bentonite, zeolite, pyrophyllite, zirconium silicate, hydrotalcite, chrysotile, xonotlite, and wollastonite. In addition, the inorganic fine particles may be subjected to a surface treatment.

In the fourth embodiment, the volume average particle size of a silicon filler is measured with a laser diffraction and scattering method using a nano particle size distribution analyzer SALD 7100 (manufactured by Shimadzu Corporation).

Next, the thermal transfer image-receiving sheet (water-based thermal transfer image-receiving sheet) used in the fourth embodiment will be described. This water-based thermal transfer image-receiving sheet is used as a transfer medium in the fourth embodiment.

(Water-Based Thermal Transfer Image-Receiving Sheet)

In the water-based thermal transfer image-receiving sheet, a water-based hollow particle layer containing at least a water-based binder and hollow particles; a water-based receiving layer containing a water-based binder and a release agent as major components are laminated on a sheet (substrate). The sheet used in the water-based thermal transfer image-receiving sheet is not particularly limited. Sheets having various materials, layer configurations, and sizes can be appropriately selected and used according to the intended use and the like. Examples of the substrate used in the water-based thermal transfer image-receiving sheet include various kinds of paper such as plain paper, coated paper, and synthetic paper (polypropylene, polystyrene, or composite materials obtained by combining the above materials with paper).

<Water-Based Hollow Particle Layer>

It is necessary that the water-based hollow particle layer containing hollow particles and an adhesive component be formed on the water-based thermal transfer image-receiving sheet according to the fourth embodiment. Thermal transfer printing is performed by heating from a thermal head and requires superior adhesion between the thermal head and an image-receiving sheet. The image-receiving paper substrate (image-receiving sheet) including the water-based hollow particle layer has cushioning properties. Therefore, the adhesion with a thermal head is improved, and a uniform image can be obtained during printing. As a material for forming a wall of the hollow particles, for example, polymers of acrylonitrile, vinylidene chloride, styrene acrylic acid ester, and the like are preferably used. Examples of a method of preparing the hollow particles include a method of sealing a foaming agent such as butane in resin particles (binder particles) and performing heat foaming; and an emulsion polymerization method. In the heat foaming method, there are two cases: a case where foaming hollow particles obtained by superheating hollow particles to foam in advance are used; and a case where a layer containing non-foaming particles is formed by coating or the like, and then a hollow structure is formed by heating such as drying. From the viewpoint of easily controlling the uniform hollowness and particle size of hollow particles, typically, foaming particles are preferably used.

<Water-Based Receiving Layer>

As a dyeable resin used in the water-based receiving layer according to the fourth embodiment, a thermoplastic resin having high affinity to a dye and superior dyeing properties is used as a binder.

[Binder]

Examples of the resin (binder) include thermoplastic resins, such as vinyl chloride resins, urethane resins, polyester resins, polycarbonate resins, polyvinyl acetal resins, polyvinyl butyral resins, polystyrene resins, polyacrylic ester resins, acrylic resins, cellulose resins, polyamide resins, and copolymer resins of vinyl compound monomers and monomers having a benzotriazole skeleton and/or a benzophenone skeleton. In addition, these thermoplastic resins may be used alone or in a combination of two or more kinds. Among these, from the viewpoints of superior light resistance of a printed image, for example, acrylic resins, copolymer resins of vinyl compound monomers and monomers having a benzotriazole skeleton and/or a benzophenone skeleton, and urethane resins are preferable. When a urethane resin is used, abnormal transfer is suppressed due to its crystalline region in the molecules. In addition, from the viewpoint of environmental load, it is necessary that the dyeable resin be a water-soluble or water-dispersible resin, that is, a so-called water-based resin.

[Release Agent]

Thermal transfer printing includes a process of superimposing a water-based receiving layer on a water-based thermal transfer image-receiving sheet, on a dye layer of an ink ribbon and heating the water-based receiving layer and the dye layer with a thermal head to peel the ink ribbon from the water-based receiving layer. Accordingly, it is required that the water-based receiving layer have releasability from an ink ribbon. Therefore, it is preferable that a release agent be added to the water-based receiving layer in order to prevent fusion bonding with an ink ribbon and improve printing runnability. Examples of the release agent added include silicone oils, polysiloxane graft acrylic resins, waxes, and fluorine compounds.

It is preferable that a cross-linking agent be added to the water-based receiving layer to improve heat resistance. As the cross-linking agent, for example, carbodiimide compounds, isocyanate compounds, oxazoline compounds, or organic titanium chelate compounds are preferable. Among these cross-linking agents, a carbodiimide-based cross-linking agent is preferable from the viewpoints of obtaining a high effect of improving heat resistance, suppressing a runnability problem such as fusion bonding of a ribbon during printing, and obtaining stability in water-based paint. The amount of the carbodiimide-based cross-linking agent added is preferably 1 part to 30 parts and more preferably 3 parts to 25 parts with respect to 100 parts of the resin contained in the water-based receiving layer. When the addition amount is less than 1 part, the sufficient cross-linking effect is not obtained, which may cause running failure during printing. When the addition amount is greater than 30 parts, a curing agent inhibits the dyeing properties of the resin, which may decrease the density of a printed image.

The coating amount of the water-based receiving layer is preferably in a range of 0.5 g/m² to 5 g/m² and more preferably in a range of 0.5 g/m² to 4 g/m². When the coating amount of the water-based receiving layer is less than 0.5 g/m², the light resistance of an image may deteriorate. In addition, when the coating amount of the water-based receiving layer is greater than 5 g/m², a dye may be diffused in the water-based receiving layer, and bleeding may occur in an image.

(Coating Method)

Various auxiliary agents which are commonly used for manufacturing coated paper are appropriately added to each of the coating layers, for example, a wetting agent, a disperser, a thickener, a defoaming agent, a colorant, an antistatic agent, or a preservative. Each of the coating layers can be formed by coating a predetermined coating solution using a well-known coater to form every single layer or simultaneously form two or more layers and drying the layers. Examples of the well-known coater include a bar coater, a gravure coater, a comma coater, a blade coater, an air knife coater, a gate roll coater, a die coater, a curtain coater, and a slide bead coater.

Hereinafter, materials used in Examples of the fourth embodiment and Comparative Examples will be described. Unless specified otherwise, "part(s)" in the following description represents "part(s) by mass".

(Preparation of Substrate Provided with Heat-Resistant Sliding Layer)

As a substrate, a 4.5 μm-thick polyethylene terephthalate film with a single surface subjected to an adhesion treatment was used. A heat-resistant sliding layer-forming coating solution 4 having the following composition was coated on a surface of the substrate which was not subjected to an adhesion treatment using a gravure coating method such that the coating amount thereof after drying was 0.5 g/m². Next, by drying the substrate at 100° C. for 1 minute, a substrate provided with a heat-resistant sliding layer was obtained.

<Heat-Resistant Sliding Layer-Forming Coating Solution 4>

| | |
|---|---|
| Silicon acrylate (US-350, manufactured by Toagosei Co., Ltd.) | 50.0 parts |
| Methyl ethyl ketone (MEK) | 50.0 parts |

(Preparation of Polyvinyl Alcohol (PVA) Resin)

The preparation of a PVA resin in the fourth embodiment is the same as (Preparation of Polyvinyl Alcohol (PVA) Resin) described in the first embodiment. Accordingly, the description of the preparation of the PVA resin in the fourth embodiment will not be repeated.

Example 4-1

An undercoat layer-forming coating solution 4-1 having the following composition was coated on the adhesion treatment-subjected surface of the heat-resistant sliding layer-provided substrate using a gravure coating method such that the coating amount thereof after drying was 0.20 g/m². Next, by drying the substrate at 100° C. for 2 minutes, an undercoat layer was formed. Next, a dye layer-forming coating solution 4-1 having the following composition was coated on the undercoat layer using a gravure coating method such that the coating amount thereof after drying was 0.70 g/m². Next, by drying the substrate at 90° C. for 1 minute, a dye layer was formed. As a result, a thermal transfer recording medium of Example 4-1 was obtained.

<Undercoat Layer-Forming Coating Solution 4-1>

| | |
|---|---|
| Polyvinyl alcohol (crystallinity degree: 25%) | 5.0 parts |
| Pure water | 57.0 parts |
| Isopropyl alcohol | 38.0 parts |

<Dye Layer-Forming Coating Solution 4-1>

| | |
|---|---|
| C.I. solvent blue 63 (anthraquinone-based dye) | 6.0 parts |
| Polyvinyl acetal resin | 4.0 parts |
| Silicon filler (volume average particle size: 2.0 μm) | 0.2 parts |
| Toluene | 44.9 parts |
| Methyl ethyl ketone | 44.9 parts |

Example 4-2

A thermal transfer recording medium of Example 4-2 was obtained with the same method as that of Example 4-1, except that, in the thermal transfer recording medium prepared in Example 4-1, the undercoat layer-forming coating solution was changed to an undercoat layer-forming coating solution 4-2 having the following composition.

<Undercoat Layer-Forming Coating Solution 4-2>

| | |
|---|---|
| Polyvinyl alcohol (crystallinity degree: 25%) | 1.8 parts |
| Polyvinyl pyrrolidone | 1.8 parts |
| Pure water | 57.0 parts |
| Isopropyl alcohol | 39.4 parts |

Example 4-3

A thermal transfer recording medium of Example 4-3 was obtained with the same method as that of Example 4-1, except that, in the thermal transfer recording medium prepared in Example 4-1, the undercoat layer-forming coating solution was changed to an undercoat layer-forming coating solution 4-3 having the following composition.

<Undercoat Layer-Forming Coating Solution 4-3>

| | |
|---|---|
| Polyvinyl alcohol (crystallinity degree: 15%) | 1.8 parts |
| Polyvinyl pyrrolidone | 1.8 parts |
| Pure water | 57.0 parts |
| Isopropyl alcohol | 39.4 parts |

Example 4-4

A thermal transfer recording medium of Example 4-4 was obtained with the same method as that of Example 4-1, except that, in the thermal transfer recording medium prepared in Example 4-1, the undercoat layer-forming coating solution was changed to an undercoat layer-forming coating solution 4-4 having the following composition.

<Undercoat Layer-Forming Coating Solution 4-4>

| | |
|---|---|
| Polyvinyl alcohol(crystallinity degree: 37%) | 1.8 parts |
| Polyvinyl pyrrolidone | 1.8 parts |
| Pure water | 57.0 parts |
| Isopropyl alcohol | 39.4 parts |

Example 4-5

A thermal transfer recording medium of Example 4-5 was obtained with the same method as that of Example 4-1, except that, in the thermal transfer recording medium prepared in Example 4-2, the undercoat layer was formed by coating and drying such that the coating amount thereof after drying was 0.03 g/m².

Example 4-6

A thermal transfer recording medium of Example 4-6 was obtained with the same method as that of Example 4-1, except that, in the thermal transfer recording medium prepared in Example 4-2, the undercoat layer was formed by coating and drying such that the coating amount thereof after drying was 0.35 g/m².

Example 4-7

A thermal transfer recording medium of Example 4-7 was obtained with the same method as that of Example 4-1, except that, in the thermal transfer recording medium prepared in Example 4-2, the dye layer-forming coating solution was changed to a dye layer-forming coating solution 4-2 having the following composition.

<Dye Layer-Forming Coating Solution 4-2>

| | |
|---|---|
| C.I. solvent blue 63 (anthraquinone-based dye) | 6.0 parts |
| Polyvinyl acetal resin | 4.0 parts |
| Silicon filler (volume average particle size: 0.7 μm) | 0.04 parts |
| Toluene | 44.98 parts |
| Methyl ethyl ketone | 44.98 parts |

Example 4-8

A thermal transfer recording medium of Example 4-8 was obtained with the same method as that of Example 4-1, except that, in the thermal transfer recording medium prepared in Example 4-2, the dye layer-forming coating solution was changed to a dye layer-forming coating solution 4-3 having the following composition.

<Dye Layer-Forming Coating Solution 4-3>

| | |
|---|---|
| C.I. solvent blue 63 (anthraquinone-based dye) | 6.0 parts |
| Polyvinyl acetal resin | 4.0 parts |
| Silicon filler (volume average particle size: 2.0 μm) | 0.3 parts |
| Toluene | 44.85 parts |
| Methyl ethyl ketone | 44.85 parts |

Comparative Example 4-1

The same dye layer-forming coating solution as that of Example 4-1 was coated on the adhesion treatment-subjected surface of the heat-resistant sliding layer-provided substrate using a gravure coating method without forming an undercoat layer thereon such that the coating amount thereof after drying was 0.70 g/m². Next, by drying the substrate at 90° C. for 1 minute, a dye layer was formed. As a result, a thermal transfer recording medium of Comparative Example 4-1 was obtained.

Comparative Example 4-2

A dye layer-forming coating solution 4-4 having the following composition was coated on the adhesion treatment-subjected surface of the heat-resistant sliding layer-provided substrate using a gravure coating method without forming an undercoat layer thereon such that the coating amount thereof after drying was 0.70 g/m². Next, by drying the substrate at 90° C. for 1 minute, a dye layer was formed. As a result, a thermal transfer recording medium of Comparative Example 4-2 was obtained.

<Dye Layer-Forming Coating Solution 4-4>

| | |
|---|---|
| C.I. solvent blue 266 (azo-based dye) | 3.0 parts |
| Polyvinyl acetal resin | 2.0 parts |
| Silicon filler (volume average particle size: 2.0 μm) | 0.2 parts |
| Toluene | 47.4 parts |
| Methyl ethyl ketone | 47.4 parts |

Comparative Example 4-3

A thermal transfer recording medium of Comparative Example 4-3 was obtained with the same method as that of Example 4-1, except that, in the thermal transfer recording medium prepared in Example 4-1, the undercoat layer-forming coating solution was changed to an undercoat layer-forming coating solution 4-5 having the following composition.

<Undercoat Layer-Forming Coating Solution 4-5>

| Polyvinyl alcohol (crystallinity degree: 10%) | 5.0 parts |
|---|---|
| Pure water | 57.0 parts |
| Isopropyl alcohol | 38.0 parts |

Comparative Example 4-4

A thermal transfer recording medium of Comparative Example 4-4 was obtained with the same method as that of Example 4-1, except that, in the thermal transfer recording medium prepared in Example 4-1, the undercoat layer-forming coating solution was changed to an undercoat layer-forming coating solution 4-6 having the following composition.
<Undercoat Layer-Forming Coating Solution 4-6>

| Polyvinyl alcohol (crystallinity degree: 10%) | 1.8 parts |
|---|---|
| Polyvinyl pyrrolidone | 1.8 parts |
| Pure water | 57.0 parts |
| Isopropyl alcohol | 38.5 parts |

Comparative Example 4-5

A thermal transfer recording medium of Comparative Example 4-5 was obtained with the same method as that of Example 4-1, except that, in the thermal transfer recording medium prepared in Comparative Example 4-3, the dye layer-forming coating solution was changed to the dye layer-forming coating solution 4-4.

Comparative Example 4-6

A thermal transfer recording medium of Comparative Example 4-6 was obtained with the same method as that of Example 4-1, except that, in the thermal transfer recording medium prepared in Example 4-1, the dye layer-forming coating solution was changed to the dye layer-forming coating solution 4-4.

Comparative Example 4-7

A thermal transfer recording medium of Comparative Example 4-7 was obtained with the same method as that of Example 4-1, except that, in the thermal transfer recording medium prepared in Example 4-2, the dye layer-forming coating solution was changed to the dye layer-forming coating solution 4-4.

Comparative Example 4-8

A thermal transfer recording medium of Comparative Example 4-8 was obtained with the same method as that of Example 4-1, except that, in the thermal transfer recording medium prepared in Example 4-1, the undercoat layer-forming coating solution was changed to an undercoat layer-forming coating solution 4-7 having the following composition.
<Undercoat Layer-Forming Coating Solution 4-7>

| Polyvinyl pyrrolidone | 5.0 parts |
|---|---|
| Pure water | 57.0 parts |
| Isopropyl alcohol | 38.0 parts |

Comparative Example 4-9

A thermal transfer recording medium of Comparative Example 4-9 was obtained with the same method as that of Example 4-1, except that, in the thermal transfer recording medium prepared in Example 4-2, the dye layer-forming coating solution was changed to a dye layer-forming coating solution 4-5 having the following composition.
<Dye Layer-Forming Coating Solution 4-5>

| C.I. solvent blue 63 (anthraquinone-based dye) | 6.0 parts |
|---|---|
| Polyvinyl acetal resin | 4.0 parts |
| Toluene | 45.0 parts |
| Methyl ethyl ketone | 45.0 parts |

Comparative Example 4-10

A thermal transfer recording medium of Comparative Example 4-10 was obtained with the same method as that of Example 4-1, except that, in the thermal transfer recording medium prepared in Example 4-2, the dye layer-forming coating solution was changed to a dye layer-forming coating solution 4-6 having the following composition.
<Dye Layer-Forming Coating Solution 4-6>

| C.I. solvent blue 63 (anthraquinone-based dye) | 6.0 parts |
|---|---|
| Polyvinyl acetal resin | 4.0 parts |
| Silicon filler (volume average particle size: 0.7 μm) | 0.02 parts |
| Toluene | 44.99 parts |
| Methyl ethyl ketone | 44.99 parts |

Comparative Example 4-11

A thermal transfer recording medium of Comparative Example 4-11 was obtained with the same method as that of Example 4-1, except that, in the thermal transfer recording medium prepared in Example 4-2, the dye layer-forming coating solution was changed to a dye layer-forming coating solution 4-7 having the following composition.
<Dye Layer-Forming Coating Solution 4-7>

| C.I. solvent blue 63 (anthraquinone-based dye) | 6.0 parts |
|---|---|
| Polyvinyl acetal resin | 4.0 parts |
| Silicon filler (volume average particle size: 2.0 μm) | 0.4 parts |
| Toluene | 44.8 parts |
| Methyl ethyl ketone | 44.8 parts |

Comparative Example 4-12

A thermal transfer recording medium of Comparative Example 4-12 was obtained with the same method as that of Example 4-1, except that, in the thermal transfer recording medium prepared in Example 4-2, the dye layer-forming coating solution was changed to a dye layer-forming coating solution 4-8 having the following composition.
<Dye Layer-Forming Coating Solution 4-8>

| C.I. solvent blue 63 (anthraquinone-based dye) | 6.0 parts |
|---|---|
| Polyvinyl acetal resin | 4.0 parts |
| Silicon filler (volume average particle size: 0.02 μm) | 0.2 parts |

| Toluene | 44.9 parts |
| Methyl ethyl ketone | 44.9 parts |

Comparative Example 4-13

A thermal transfer recording medium of Comparative Example 4-13 was obtained with the same method as that of Example 4-1, except that, in the thermal transfer recording medium prepared in Example 4-2, the dye layer-forming coating solution was changed to a dye layer-forming coating solution 4-9 having the following composition.
<Dye Layer-Forming Coating Solution 4-9>

| C.I. solvent blue 63 (anthraquinone-based dye) | 6.0 parts |
| Polyvinyl acetal resin | 4.0 parts |
| Silicon filler (volume average particle size: 5.0 μm) | 0.2 parts |
| Toluene | 44.9 parts |
| Methyl ethyl ketone | 44.9 parts |

(Preparation of Transfer Medium 4)

As the water-based thermal transfer image-receiving sheet which was the transfer medium 4, art paper having a thickness of 180 g/m² was used. A water-based hollow particle layer-forming coating solution 4 having the following composition was coated on the art paper using a gravure coating method such that the coating amount thereof after drying was 10 g/m², followed by drying. Next, by aging the art paper in an environment of 40° C. for 1 week, a water-based thermal transfer image-receiving sheet provided with the hollow particle layer was obtained.
<Water-Based Hollow Particle Layer-Forming Coating Solution 4>

Acrylonitrile and methacrylonitrile were used as major components.

| Foaming hollow particle composed of a copolymer (volume average particle size: 3.2 μm, volume hollowness: 85%) | 45.0 parts |
| Polyvinyl alcohol | 10.0 parts |
| Vinyl chloride-vinyl acetate copolymer resin dispersion (Vinyl chloride/vinyl acetate = 70/30, Tg: 64° C.) | 45.0 parts |
| Water | 200.0 parts |

A water-based receiving layer-forming coating solution 4 having the following composition was coated on the water-based hollow particle layer using a gravure coating method such that the coating amount thereof after drying was 4 g/m², followed by drying. Next, by aging the art paper in an environment of 40° C. for 1 week, a transfer medium 4 for thermal transfer on which a water-based receiving layer was formed was obtained.
<Water-Based Receiving Layer-Forming Coating Solution 4>

| Urethane resin (glass transition temperature: −20° C.) | 96.0 parts |
| Association type urethane-based thickener | 1.0 part |
| Sulfonic acid-based surfactant | 2.0 parts |
| Silicone oil | 1.0 part |
| Water | 200.0 parts |

<Adhesion Evaluation of Dye Layer at Room Temperature>

Regarding the thermal transfer recording mediums of Examples 4-1 to 4-8 and Comparative Examples 4-1 to 4-13, a cellophane tape having a width of 18 mm and a length of 150 mm was attached on the dye layer of the thermal transfer recording medium stored at room temperature. Next, when the tape was immediately detached, whether or not the attachment of the dye layer on the cellophane tape side was observed was investigated for the evaluation, and the results thereof are shown in Table 5.

The criteria of the adhesion evaluation in the fourth embodiment are the same as those of <Adhesion Evaluation of Dye Layer at Room Temperature> described in the first embodiment. Accordingly, the description of the criteria of the adhesion evaluation in the fourth embodiment will not be repeated.
<Printing Evaluation>

Regarding the thermal transfer recording mediums of Examples 4-1 to 4-8 and Comparative Examples 4-1 to 4-13, a printing evaluation was performed using the thermal transfer recording medium stored at room temperature, the thermal transfer recording medium stored in an environment of 40° C. and 90% RH for 72 hours and further stored at room temperature for 24 hours, and the transfer medium 4. By printing solid images using a thermal simulator, a maximum reflection density and whether or not abnormal transfer was observed were investigated for the evaluation, and the results thereof are shown in Table 5. As in the case of the first embodiment, "Maximum reflection density" in Table 4 which is an index indicating "transfer sensitivity (transfer density)" is a value obtained by measuring printed materials during high-energy printing with a spectrodensitometer "528" (manufactured by X-Rite inc.). In addition, the printing conditions in the fourth embodiment are the same as those in <Printing Evaluation> described in the first embodiment. Accordingly, the description of the printing conditions in the fourth embodiment will not be repeated.
<Abnormal Transfer Evaluation>

Abnormal transfer was evaluated based on the following criteria. A or higher is a level at which there was practically no problem.

O: Abnormal transfer to the transfer medium 4 was not observed

ΔO: Abnormal transfer to the transfer medium 4 was observed to an extremely small degree Δ: Abnormal transfer to the transfer medium 4 was observed to a small degree X: Abnormal transfer to the transfer medium 4 was observed on the entire surface
<Measurement of Three-Dimensional Surface Roughness of Dye Layer>

Regarding the thermal transfer recording mediums of Examples 4-1 to 4-8 and Comparative Examples 4-1 to 4-13, the three-dimensional surface roughness SRa of the dye layer of the thermal transfer recording medium was measured using a scanning confocal laser microscope "OLS1100" (manufactured by Olympus Corporation) under the following conditions, and the results thereof are shown in Table 5.

Measurement and analysis conditions are as follows.

Scanning direction: MD direction of sample

Measured length: 128 μm in X direction, 128 μm in Y direction

Cut-off value: ⅓
<Evaluation of Tint Non-Uniformity in High-Density Portion>

In addition, tint non-uniformity in a high-density portion was evaluated based on the following criteria.

O: Tint non-uniformity in a high-density portion was not observed

Δ: Tint non-uniformity in a high-density portion was observed to a small degree

X: Tint non-uniformity in a high-density portion was clearly observed

A or higher is a level at which there was practically no problem.

In addition, when Example 4-1 was compared to Comparative Examples 4-1, 4-2, and 4-5, in the absence of polyvinyl alcohol, a difference in transfer density between the anthraquinone-based dye and the other dyes was not shown.

TABLE 5

| | | | | Printing Evaluation | | | | |
|---|---|---|---|---|---|---|---|---|
| | | | | | | | Product Stored in High-Temperature and High-Humidity Environment (72 h) | |
| | Coating Amount (g/m²) of Undercoat Layer | Adhesion of Dye Layer at Room Temperature | | Product Stored at Room Temperature | | | | |
| | | | Surface Roughness SRa (μm) | Maximum Reflection Density | Tint Non-Uniformity in High-Density Portion | Abnormal Transfer | Maximum Reflection Density | Abnormal Transfer |
| Ex. 4-1 | 0.2 | ○ | 0.49 | 2.55 | ○ | ○ | 2.55 | Δ○ |
| Ex. 4-2 | 0.2 | ○ | 0.51 | 2.51 | ○ | ○ | 2.49 | ○ |
| Ex. 4-3 | 0.2 | ○ | 0.50 | 2.50 | ○ | ○ | 2.48 | ○ |
| Ex. 4-4 | 0.2 | ○ | 0.49 | 2.55 | ○ | ○ | 2.53 | ○ |
| Ex. 4-5 | 0.03 | ○ | 0.51 | 2.53 | ○ | ○ | 2.51 | Δ |
| Ex. 4-6 | 0.35 | ○ | 0.48 | 2.48 | ○ | ○ | 2.46 | ○ |
| Ex. 4-7 | 0.2 | ○ | 0.16 | 2.52 | Δ | ○ | 2.49 | ○ |
| Ex. 4-8 | 0.2 | ○ | 0.62 | 2.47 | ○ | ○ | 2.49 | ○ |
| Comp. Ex. 4-1 | — | — | 0.48 | 1.85 | ○ | ○ | 1.83 | ○ |
| Comp. Ex. 4-2 | — | — | 0.51 | 1.85 | ○ | ○ | 1.83 | ○ |
| Comp. Ex. 4-3 | 0.2 | ○ | 0.51 | 2.45 | ○ | Δ | Not able to be Measured | X |
| Comp. Ex. 4-4 | 0.2 | ○ | 0.49 | 2.29 | ○ | ○ | 2.30 | Δ |
| Comp. Ex. 4-5 | 0.2 | ○ | 0.52 | 2.16 | ○ | Δ | Not able to be Measured | X |
| Comp. Ex. 4-6 | 0.2 | ○ | 0.48 | 2.27 | ○ | ○ | 2.25 | Δ○ |
| Comp. Ex. 4-7 | 0.2 | ○ | 0.50 | 2.19 | ○ | ○ | 2.17 | ○ |
| Comp. Ex. 4-8 | 0.2 | | 0.49 | 1.98 | ○ | ○ | 1.96 | ○ |
| Comp. Ex. 4-9 | 0.2 | ○ | 0.10 | 2.52 | X | ○ | 2.5 | ○ |
| Comp. Ex. 4-10 | 0.2 | ○ | 0.12 | 2.50 | X | ○ | 2.49 | ○ |
| Comp. Ex. 4-11 | 0.2 | ○ | 0.77 | 2.18 | ○ | Δ | 2.16 | |
| Comp. Ex. 4-12 | 0.2 | ○ | 0.1 | 2.51 | X | ○ | 2.49 | ○ |
| Comp. Ex. 4-13 | 0.2 | ○ | 0.85 | 2.15 | ○ | Δ | 2.13 | Δ |

In the results of Table 5, when the thermal transfer recording mediums of Examples 4-1 to 4-6 in which the undercoat layer was provided were compared to the thermal transfer recording mediums of Comparative Examples 4-1 and 4-2 in which the undercoat layer was not provided, the maximum reflection density was clearly higher. It was found from the results that the transfer sensitivity was high during high-speed printing.

However, in the presence of polyvinyl alcohol, a difference in transfer density between the anthraquinone-based dye and the other dyes was shown. It was found from this result that polyvinyl alcohol had an effect of improving transfer sensitivity on the anthraquinone-based dye.

Further, when Comparative Example 4-8 containing polyvinyl pyrrolidone was compared to the examples containing polyvinyl alcohol, deterioration in adhesion after storage in a high-temperature and high-humidity environment was not shown. However, it was found from low maximum reflection density that the transfer sensitivity was low.

In addition, in Example 4-1 and Comparative Example 4-3, when a polyvinyl alcohol having a crystallinity degree of 10% was used for the undercoat layer, abnormal transfer was observed after storage in a high-temperature and high-humidity environment. However, it was found that, when a polyvinyl alcohol having a crystallinity degree of 25% was used for the undercoat layer, abnormal transfer was observed to a small degree but was greatly improved.

Further, in Example 4-2 and Comparative Example 4-4, it was found that, in the presence of polyvinyl pyrrolidone, the adhesion after storage in a high-temperature and high-humidity environment was improved and abnormal transfer was suppressed. However, in Examples 4-2 to 4-4 in which polyvinyl alcohols having crystallinity degrees of 15%, 25%, and 37% were used, respectively, abnormal transfer was not observed. On the other hand, in Comparative Example 4-4 in which a polyvinyl alcohol having a crystallinity degree of 10% was used, abnormal transfer was still observed.

Further, in Examples 4-1 to 4-4 and Comparative Examples 4-3 and 4-4, when the crystallinity degree of polyvinyl alcohol was higher than or equal to 15%, the transfer density was not greatly decreased by the addition of polyvinyl pyrrolidone; however, when the crystallinity degree of polyvinyl alcohol was less than 15%, the transfer density was greatly decreased. It was found that from the results that the crystallinity degree of polyvinyl alcohol was necessarily higher than or equal to 15%.

In addition, when the thermal transfer recording medium of Example 4-5 was compared to the thermal transfer recording medium of Example 4-2, it was found that the adhesion after storage in a high-temperature and high-humidity was decreased to some extent because the coating amount of the undercoat layer was less than 0.05 g/m².

In addition, when the thermal transfer recording medium of Example 4-6 was also compared to the thermal transfer recording medium of Example 4-2, it was found that the effect of improving the transfer sensitivity was decreased because the coating amount of the undercoat layer was greater than 0.30 g/m².

In Examples 4-1 to 4-6 and 4-8 in which the three-dimensional surface roughness SRa was about 0.5, tint non-uniformity in a high-density portion was not observed. In addition, when the thermal transfer recording medium of Example 4-7 was compared to Examples 4-1 to 4-6 and 4-8, it was found that tint non-uniformity was poorer, probably due to the low three-dimensional surface roughness SRa. On the other hand, in the thermal transfer recording medium of Example 4-8, it was found that, probably due to the high three-dimensional surface roughness SRa of the dye layer, tint non-uniformity in a high-density portion was suppressed; however, the transfer sensitivity was slightly decreased.

In addition, in the thermal transfer recording medium of Comparative Example 4-9, since the dye layer did not contain the filler particles, thermal fusion bonding occurred during printing, and tint non-uniformity in a high-density portion was observed. In addition, in the thermal transfer recording medium of Comparative Example 4-10, the dye layer contained the filler particles; however, the three-dimensional surface roughness SRa was less than 0.15, and the surface of the dye layer was excessively flat. Therefore, it was found that tint non-uniformity in a high-density portion was not sufficiently suppressed. On the other hand, in the thermal transfer recording medium of Comparative Example 4-11, the amount of the filler particles added in the dye layer was large, and the three-dimensional surface roughness SRa of the dye layer was higher than 0.7. Therefore, it was found that the transfer sensitivity deteriorated and abnormal transfer occurred even in a product stored at room temperature.

In addition, in the thermal transfer recording medium of Comparative Example 4-13, the volume average particle size of the filler particles in the dye layer was small at 0.02 μm, and the three-dimensional surface roughness SRa of the dye layer was lower than 0.15. Therefore, it was found that tint non-uniformity in a high-density portion was not able to be sufficiently suppressed. On the other hand, in the thermal transfer recording medium of Comparative Example 4-12, the volume average particle size of the filler particles in the dye layer was large at 5.0 μm, and the three-dimensional surface roughness SRa of the dye layer was higher than 0.70. Therefore, it was found that the transfer sensitivity was decreased.

In addition, when the thermal transfer recording medium after printing was observed with an optical microscope, it was found that the filler particles were separated from the dye layer.

As described above, in the thermal transfer recording medium according to the fourth embodiment, the undercoat layer 20 contains a polyvinyl pyrrolidone and a polyvinyl alcohol having a crystallinity degree of 15% or higher as major components, and the dye layer 30 contains filler particles and an anthraquinone-based thermal transfer dye, in which the three-dimensional surface roughness SRa of the dye layer 30 is in a range of 0.15 μm to 0.70 μm. As a result, the transfer sensitivity during high-speed printing is high, that is, a high-density image can be obtained without increasing the amount of a dye used in the dye layer 30. In addition, it is possible to provide a thermal transfer recording medium capable of preventing abnormal transfer during printing after storage in a high-temperature and high-humidity environment; and obtaining a printed material in which density non-uniformity in a high-density portion is sufficiently suppressed even when a thermal transfer image-receiving sheet on which a water-based receiving layer is formed is used.

Therefore, in the thermal transfer recording medium according to the fourth embodiment, the transfer sensitivity during high-speed printing is low. As a result, it is possible to solve the problem that the amount of a dye used in a dye layer cannot be decreased. In addition, it is possible to solve the problem that abnormal transfer occurs during printing after storage in a high-temperature and high-humidity environment. Further, it is possible to solve the problem that density non-uniformity in a high-density portion occurs when an image is formed by thermal transfer using a thermal transfer image-receiving sheet on which a water-based receiving layer is formed.

Fifth Embodiment

Hereinafter, a fifth embodiment of the thermal transfer recording medium according to the present invention will be described.

(Thermal Transfer Recording Medium)

The thermal transfer recording medium according to the fifth embodiment is a thermal transfer recording medium having the same structure as that of the thermal transfer recording medium 1 described in the first embodiment. That is, in the thermal transfer recording medium according to the fifth embodiment, as illustrated in FIG. 1, the heat-resistant sliding layer 40 is formed on one surface of the substrate 10, and the undercoat layer 20 and the dye layer 30 are sequentially laminated on the other surface of the substrate 10.

The fifth embodiment is different from the first embodiment mainly in that the dye layer 30 has a different configuration, but the other configurations are the same. Accordingly, in the following description, only the above-described different configuration will be described, and the description of the same configurations will not be repeated.

<Dye Layer>

The dye layer 30 according to the fifth embodiment is a layer containing an anthraquinone-based thermal transfer dye and a release agent containing at least two modified silicone oils. As a material of the dye layer 30, a well-known material of the related art can be used. For example, the dye layer 30 is a layer formed by mixing a thermal transfer dye, a binder, a solvent, and the like with each other to prepare a coating solution for forming a dye layer and performing coating and drying. The dye layer 30 may be a layer including a single layer of one color. In addition, the dye layer 30 may also be a layer in which plural dye layers containing different color dyes are sequentially and repeatedly formed on the same surface of the same substrate.

The thermal transfer dye of the fifth embodiment is the same as that of the first embodiment. Accordingly, the description of the thermal transfer dye in the fifth embodiment will not be repeated.

In addition, the binder of the fifth embodiment is the same as that of the first embodiment. Accordingly, the description of the binder in the fifth embodiment will not be repeated.

[Release Agent]

In the fifth embodiment, in order to apply the thermal transfer recording medium to a water-based thermal transfer image-receiving sheet, the dye layer 30 contains a release agent containing at least two modified silicone oils. As a result, fusion bonding between the dye layer 30 and a transfer medium can be prevented.

In the above-described water-based thermal transfer image-receiving sheet, it was confirmed that there was a difference in the releasability required during printing between a case where high energy was applied from a thermal head and a case where low energy was applied from a thermal head. As a release agent which exhibits its effect during the application of high energy, a non-reactive silicone oil having a molecular weight of 8,000 or higher and having side chains modified with a polyether is preferably used.

In addition, as a release agent which exhibits its effect during the application of low energy, a reactive silicone oil having a molecular weight of 5,000 or lower and having both terminals modified with an amino is preferably used. A non-reactive release agent having a high molecular weight is effective for maintaining sufficient releasability when printing is performed with high energy. On the other hand, a reactive release agent having a low molecular weight has a characteristic of being localized on a surface and is effective for obtaining sufficient releasability even when printing is performed with low energy.

The content ratio of the release agent to the binder of the dye layer 30 is preferably in a range of 0.5 mass % to 2.0 mass % and particularly preferably in a range of 1.0 mass % to 1.5 mass %.

When the content ratio of the release agent to the binder of the dye layer 30 is less than 0.5 mass %, fusion bonding between the dye layer 30 and a transfer medium is likely to occur during printing, and abnormal transfer may occur. On the other hand, when the content ratio of the release agent to the binder of the dye layer 30 is greater than 2.0 mass %, the sliding property with a transfer medium is improved; however, the sublimation of a dye is inhibited, and the transfer sensitivity during high-speed printing may deteriorate.

In the fifth embodiment, a water-based thermal transfer image-receiving sheet is used as a transfer medium. This water-based thermal transfer image-receiving sheet is the same image-receiving sheet as that described in (Water-Based Thermal Transfer Image-Receiving Sheet) of the fourth embodiment. Accordingly, the description of the water-based thermal transfer image-receiving sheet in the fifth embodiment will not be repeated.

In addition, in the fourth embodiment, the method (coating method) of forming the water-based hollow particle layer and the water-based receiving layer, which are included in the water-based thermal transfer image-receiving sheet, is described, and the same coating method as that of the fourth embodiment is used in the fifth embodiment. Accordingly, in the fifth embodiment, the description of the method (coating method) of forming the water-based hollow particle layer and the water-based receiving layer will not be repeated.

Hereinafter, materials used in Examples of the fifth embodiment and Comparative Examples will be described. Unless specified otherwise, "part(s)" in the following description represents "part(s) by mass".

(Preparation of Substrate Provided with Heat-Resistant Sliding Layer)

As a substrate, a 4.5 μm-thick polyethylene terephthalate film with a single surface subjected to an adhesion treatment was used. A heat-resistant sliding layer-forming coating solution 5-1 having the following composition was coated on a surface of the substrate which was not subjected to an adhesion treatment using a gravure coating method such that the coating amount thereof after drying was 0.5 g/m². Next, by drying the substrate at 100° C. for 1 minute, a substrate provided with a heat-resistant sliding layer was obtained.

<Heat-Resistant Sliding Layer-Forming Coating Solution 5-1>

| | |
|---|---|
| Silicon acrylate (US-350, manufactured by Toagosei Co., Ltd.) | 50.0 parts |
| Methyl ethyl ketone | 50.0 parts |

(Preparation of Polyvinyl Alcohol (PVA) Resin)

The preparation of a PVA resin in the fifth embodiment is the same as (Preparation of Polyvinyl Alcohol (PVA) Resin) described in the first embodiment. Accordingly, the description of the preparation of the PVA resin in the fifth embodiment will not be repeated.

Reference Example

An undercoat layer-forming coating solution 5-1 having the following composition was coated on the adhesion treatment-subjected surface of the heat-resistant sliding layer-provided substrate using a gravure coating method such that the coating amount thereof after drying was 0.20 g/m². Next, by drying the substrate at 100° C. for 2 minutes, an undercoat layer was formed. Next, a dye layer-forming coating solution 5-1 having the following composition was coated on the undercoat layer using a gravure coating method such that the coating amount thereof after drying was 0.70 g/m². Next, by drying the substrate at 90° C. for 1 minute, a dye layer was formed. As a result, a thermal transfer recording medium of Reference Example was obtained.

<Undercoat Layer-Forming Coating Solution 5-1>

| | |
|---|---|
| Polyvinyl alcohol (crystallinity degree: 25%) | 5.0 parts |
| Pure water | 57.0 parts |
| Isopropyl alcohol | 38.0 parts |

<Dye Layer-Forming Coating Solution 5-1>

| | |
|---|---|
| C.I. solvent blue 63 (anthraquinone-based dye) | 6.0 parts |
| Polyvinyl acetal resin | 4.0 parts |
| Polyether-modified silicone oil | 0.02 parts |
| (side chains modified, molecular weight: 10,000) | |
| Amino-modified silicone oil | 0.02 parts |
| (both terminals modified, molecular weight: 3,000) | |
| Toluene | 45.0 parts |
| Methyl ethyl ketone | 45.0 parts |

Example 5-1

A thermal transfer recording medium of Example 5-1 was obtained with the same method as that of Reference Example, except that, in the thermal transfer recording medium prepared in Reference Example, the undercoat layer-forming coating solution was changed to an undercoat layer-forming coating solution 5-2 having the following composition.

<Undercoat Layer-Forming Coating Solution 5-2>

| | |
|---|---|
| Polyvinyl alcohol (crystallinity degree: 25%) | 1.8 parts |
| Polyvinyl pyrrolidone | 1.8 parts |
| Pure water | 57.0 parts |
| Isopropyl alcohol | 39.4 parts |

Example 5-2

A thermal transfer recording medium of Example 5-2 was obtained with the same method as that of Reference Example, except that, in the thermal transfer recording medium prepared in Reference Example, the undercoat layer-forming coating solution was changed to an undercoat layer-forming coating solution 5-3 having the following composition.

<Undercoat Layer-Forming Coating Solution 5-3>

| | |
|---|---|
| Polyvinyl alcohol (crystallinity degree: 15%) | 1.8 parts |
| Polyvinyl pyrrolidone | 1.8 parts |
| Pure water | 57.0 parts |
| Isopropyl alcohol | 39.4 parts |

Example 5-3

A thermal transfer recording medium of Example 5-3 was obtained with the same method as that of Reference Example, except that, in the thermal transfer recording medium prepared in Reference Example, the undercoat layer-forming coating solution was changed to an undercoat layer-forming coating solution 5-4 having the following composition.

<Undercoat Layer-Forming Coating Solution 5-4>

| | |
|---|---|
| Polyvinyl alcohol (crystallinity degree: 37%) | 1.8 parts |
| Polyvinyl pyrrolidone | 1.8 parts |
| Pure water | 57.0 parts |
| Isopropyl alcohol | 39.4 parts |

Example 5-4

A thermal transfer recording medium of Example 5-4 was obtained with the same method as that of Example 5-1, except that, in the thermal transfer recording medium prepared in Example 5-1, the undercoat layer was formed by coating and drying such that the coating amount thereof after drying was 0.03 g/m$^2$.

Example 5-5

A thermal transfer recording medium of Example 5-5 was obtained with the same method as that of Example 5-1, except that, in the thermal transfer recording medium prepared in Example 5-1, the undercoat layer was formed by coating and drying such that the coating amount thereof after drying was 0.35 g/m$^2$.

Example 5-6

A thermal transfer recording medium of Example 5-6 was obtained with the same method as that of Example 5-1, except that, in the thermal transfer recording medium prepared in Example 5-1, the dye layer-forming coating solution was changed to a dye layer-forming coating solution 5-2 having the following composition.

<Dye Layer-Forming Coating Solution 5-2>

| | |
|---|---|
| C.I. solvent blue 63 (anthraquinone-based dye) | 6.0 parts |
| Polyvinyl acetal resin | 4.0 parts |
| Polyether-modified silicone oil | 0.008 parts |
| (side chains modified, molecular weight: 10,000) | |
| Amino-modified silicone oil | 0.008 parts |
| (both terminals modified, molecular weight: 3,000) | |
| Toluene | 45.0 parts |
| Methyl ethyl ketone | 45.0 parts |

Example 5-7

A thermal transfer recording medium of Example 5-7 was obtained with the same method as that of Example 5-1, except that, in the thermal transfer recording medium prepared in Example 5-1, the dye layer-forming coating solution was changed to a dye layer-forming coating solution 5-3 having the following composition.

<Dye Layer-Forming Coating Solution 5-3>

| | |
|---|---|
| C.I. solvent blue 63 (anthraquinone-based dye) | 6.0 parts |
| Polyvinyl acetal resin | 4.0 parts |
| Polyether-modified silicone oil | 0.05 parts |
| (side chains modified, molecular weight:10,000) | |
| Amino-modified silicone oil | 0.05 parts |
| (both terminals modified,molecular weight: 3,000) | |
| Toluene | 45.0 parts |
| Methyl ethyl ketone | 45.0 parts |

Comparative Example 5-1

The same dye layer-forming coating solution 5-1 as that of Reference Example was coated on the adhesion treatment-subjected surface of the heat-resistant sliding layer-provided substrate using a gravure coating method without forming an undercoat layer thereon such that the coating amount thereof after drying was 0.70 g/m$^2$. Next, by drying the substrate at 90° C. for 1 minute, a dye layer was formed. As a result, a thermal transfer recording medium of Comparative Example 5-1 was obtained.

Comparative Example 5-2

A dye layer-forming coating solution 5-4 having the following composition was coated on the adhesion treatment-subjected surface of the heat-resistant sliding layer-provided substrate using a gravure coating method without forming an undercoat layer thereon such that the coating amount thereof after drying was 0.70 g/m². Next, by drying the substrate at 90° C. for 1 minute, a dye layer was formed. As a result, a thermal transfer recording medium of Comparative Example 5-2 was obtained.

<Dye Layer-Forming Coating Solution 5-4>

| | |
|---|---|
| C.I. solvent blue 266 (azo-based dye) | 6.0 parts |
| Polyvinyl acetal resin | 4.0 parts |
| Polyether-modified silicone oil | 0.02 parts |
| (side chains modified, molecular weight: 10,000) | |
| Amino-modified silicone oil | 0.02 parts |
| (both terminals modified, molecular weight: 3,000) | |
| Toluene | 45.0 parts |
| Methyl ethyl ketone | 45.0 parts |

Comparative Example 5-3

A thermal transfer recording medium of Comparative Example 5-3 was obtained with the same method as that of Reference Example, except that, in the thermal transfer recording medium prepared in Reference Example, the undercoat layer-forming coating solution was changed to an undercoat layer-forming coating solution 5-5 having the following composition.

<Undercoat Layer-Forming Coating Solution 5-5>

| | |
|---|---|
| Polyvinyl alcohol (crystallinity degree: 10%) | 5.0 parts |
| Pure water | 57.0 parts |
| Isopropyl alcohol | 38.0 parts |

Comparative Example 5-4

A thermal transfer recording medium of Comparative Example 5-4 was obtained with the same method as that of Reference Example, except that, in the thermal transfer recording medium prepared in Reference Example, the undercoat layer-forming coating solution was changed to an undercoat layer-forming coating solution 5-6 having the following composition.

<Undercoat Layer-Forming Coating Solution 5-6>

| | |
|---|---|
| Polyvinyl alcohol (crystallinity degree: 10%) | 1.8 parts |
| Polyvinyl pyrrolidone | 1.8 parts |
| Pure water | 57.0 parts |
| Isopropyl alcohol | 38.5 parts |

Comparative Example 5-5

A thermal transfer recording medium of Comparative Example 5-5 was obtained with the same method as that of Comparative Example 5-3, except that, in the thermal transfer recording medium prepared in Comparative Example 5-3, the dye layer-forming coating solution was changed to the dye layer-forming coating solution 5-4.

Comparative Example 5-6

A thermal transfer recording medium of Comparative Example 5-6 was obtained with the same method as that of Reference Example, except that, in the thermal transfer recording medium prepared in Reference Example, the dye layer-forming coating solution was changed to the dye layer-forming coating solution 5-4.

Comparative Example 5-7

A thermal transfer recording medium of Comparative Example 5-7 was obtained with the same method as that of Example 5-2, except that, in the thermal transfer recording medium prepared in Example 5-2, the dye layer-forming coating solution was changed to the dye layer-forming coating solution 5-4.

Comparative Example 5-8

A thermal transfer recording medium of Comparative Example 5-8 was obtained with the same method as that of Reference Example, except that, in the thermal transfer recording medium prepared in Reference Example, the undercoat layer-forming coating solution was changed to an undercoat layer-forming coating solution 5-7 having the following composition.

<Undercoat Layer-Forming Coating Solution 5-7>

| | |
|---|---|
| Polyvinyl pyrrolidone | 5.0 parts |
| Pure water | 57.0 parts |
| Isopropyl alcohol | 38.0 parts |

Comparative Example 5-9

A thermal transfer recording medium of Comparative Example 5-9 was obtained with the same method as that of Example 5-2, except that, in the thermal transfer recording medium prepared in Example 5-2, the dye layer-forming coating solution was changed to a dye layer-forming coating solution 5-5 having the following composition.

<Dye Layer-Forming Coating Solution 5-5>

| | |
|---|---|
| C.I. solvent blue 63 (anthraquinone-based dye) | 6.0 parts |
| Polyvinyl acetal resin | 4.0 parts |
| Polyether-modified silicone oil | 0.04 parts |
| (side chains modified, molecular weight: 10,000) | |
| Toluene | 45.0 parts |
| Methyl ethyl ketone | 45.0 parts |

Comparative Example 5-10

A thermal transfer recording medium of Comparative Example 5-10 was obtained with the same method as that of Example 5-2, except that, in the thermal transfer recording medium prepared in Example 5-2, the dye layer-forming coating solution was changed to a dye layer-forming coating solution 5-6 having the following composition.

<Dye Layer-Forming Coating Solution 5-6>

| | |
|---|---|
| C.I. solvent blue 63 (anthraquinone-based dye) | 6.0 parts |
| Polyvinyl acetal resin | 4.0 parts |
| Amino-modified silicone oil | 0.04 parts |
| (both terminals modified, molecular weight: 3,000) | |
| Toluene | 45.0 parts |
| Methyl ethyl ketone | 45.0 parts |

Preparation of Transfer Medium 5

As a substrate, art paper having a thickness of 180 g/m² was used. A water-based hollow particle layer-forming coating solution 5 having the following composition was coated on the substrate using a gravure coating method such that the coating amount thereof after drying was 10 g/m², followed by drying. Next, by aging the art paper in an environment of 40° C. for 1 week, an image-receiving sheet provided with a water-based hollow particle layer was obtained.

<Water-Based Hollow Particle Layer-Forming Coating Solution 5>

Acrylonitrile and methacrylonitrile were used as major components.

| | |
|---|---|
| Foaming hollow particle composed of a copolymer (volume average particle size: 3.2 μm, volume hollowness: 85%) | 45.0 parts |
| Polyvinyl alcohol | 10.0 parts |
| Vinyl chloride-vinyl acetate copolymer resin dispersion (Vinyl chloride/vinyl acetate = 70/30, Tg: 64° C.) | 45.0 parts |
| Water | 200.0 parts |

A water-based receiving layer-forming coating solution 5 having the following composition was coated on the water-based hollow particle layer using a gravure coating method such that the coating amount thereof after drying was 4 g/m², followed by drying. Next, by aging the art paper in an environment of 40° C. for 1 week, a transfer medium for thermal transfer on which a water-based receiving layer was formed was prepared.

<Water-Based Receiving Layer-Forming Coating Solution 5>

| | |
|---|---|
| Urethane resin (Tg: −20° C.) | 97.0 parts |
| Association type urethane-based thickener | 1.0 part |
| Sulfonic acid-based surfactant | 2.0 parts |
| Water | 200 parts |

<Adhesion Evaluation of Dye Layer at Room Temperature>

Regarding the thermal transfer recording mediums of Reference Example, Examples 5-1 to 5-7 and Comparative Examples 5-1 to 5-10, a cellophane tape having a width of 18 mm and a length of 150 mm was attached to the dye layer of the thermal transfer recording medium stored at room temperature. Next, when the tape was immediately detached, whether or not the attachment of the dye layer on the cellophane tape side was observed was investigated for the evaluation, and the results thereof are shown in Table 6.

The criteria of the adhesion evaluation in the fifth embodiment are the same as those of <Adhesion Evaluation of Dye Layer at Room Temperature> described in the first embodiment. Accordingly, the description of the criteria of the adhesion evaluation in the fifth embodiment will not be repeated.

<Printing Evaluation>

Regarding the thermal transfer recording mediums of Reference Example, Examples 5-1 to 5-7 and Comparative Examples 5-1 to 5-10, a printing evaluation was performed using the thermal transfer recording medium stored at room temperature, the thermal transfer recording medium stored in an environment of 40° C. and 90% RH for 72 hours and further stored at room temperature for 24 hours, and the transfer medium 5. By printing solid images using a thermal simulator with high energy and with low energy, whether or not abnormal transfer was observed was investigated for the evaluation, and the results thereof are shown in Table 6. As in the case of the first embodiment, "Maximum reflection density" in Table 6 which is an index indicating "transfer sensitivity (transfer density)" is a value obtained by measuring printed materials during high-energy printing with a spectrodensitometer "528" (manufactured by X-Rite inc.). In "Printing Evaluation" of Table 6, it is preferable that "transfer sensitivity" shown in "Maximum Reflection Density of Product Stored at Room Temperature" and "Maximum Reflection Density of Product Stored in High-Temperature and High-Humidity Environment (72 h)" be "greater than or equal to 2.30".

Printing conditions are as follows.
Printing environment: 23° C., 50% RH
Applied voltage: 29 V (high energy), 10V (low energy)
Line period: 0.7 msec
Print density: main scanning: 300 dpi, sub scanning: 300 dpi <Abnormal Transfer Evaluation>

Abnormal transfer was evaluated based on the following criteria. ○ or ○Δ is a level at which there was practically no problem.

○: Abnormal transfer to the transfer medium 5 was not observed

○Δ: Abnormal transfer to the transfer medium 5 was observed to an extremely small degree
(Level at which Abnormal Transfer was Able to be Confirmed when a Printed Material was Observed in an Enlarged Manner Using a Magnifying Glass)

Δ○: Abnormal transfer to the transfer medium 5 was observed to an extremely small degree
(Level at which abnormal transfer was able to be confirmed by visual inspection)

Δ: Abnormal transfer to the transfer medium 5 was observed to a small degree

X: Abnormal transfer to the transfer medium 5 was observed on the entire surface

TABLE 6

| | | | Printing Evaluation | | | |
|---|---|---|---|---|---|---|
| | | | Product Stored at Room Temperature | | Product Stored in High-Temperature and High-Humidity Environment (72 h) | |
| | Coating Amount (g/m²) of Undercoat Layer after Drying | Adhesion of Dye Layer at Room Temperature | Maximum Reflection Density | Abnormal Transfer (High E/ Low E) | Maximum Reflection Density | Abnormal Transfer (High E/ Low E) |
| Ex. | 0.2 | ○ | 2.55 | ○/○ | 2.55 | Δ○/○ |
| Ex. 5-1 | 0.2 | ○ | 2.51 | ○/○ | 2.49 | ○/○ |
| Ex. 5-2 | 0.2 | ○ | 2.50 | ○/○ | 2.48 | ○/○ |
| Ex. 5-3 | 0.2 | ○ | 2.55 | ○/○ | 2.53 | ○/○ |
| Ex. 5-4 | 0.03 | ○ | 2.53 | ○/○ | 2.51 | ○Δ/○ |
| Ex. 5-5 | 0.35 | ○ | 2.48 | ○/○ | 2.46 | ○/○ |
| Ex. 5-6 | 0.2 | ○ | 2.52 | ○/○Δ | 2.50 | ○Δ/○Δ |
| Ex. 5-7 | 0.2 | ○ | 2.45 | ○/○ | 2.46 | ○/○ |
| Comp. Ex. 5-1 | — | — | 1.85 | ○/○ | 1.83 | ○/○ |
| Comp. Ex. 5-2 | — | — | 1.85 | ○/○ | 1.83 | ○/○ |
| Comp. Ex. 5-3 | 0.2 | ○ | 2.45 | Δ/Δ | Not able to be Measured | X/X |

TABLE 6-continued

| | | Printing Evaluation | | | | |
|---|---|---|---|---|---|---|
| | Coating Amount (g/m²) of Undercoat Layer after Drying | Adhesion of Dye Layer at Room Temperature | Product Stored at Room Temperature | | Product Stored in High-Temperature and High-Humidity Environment (72 h) | |
| | | | Maximum Reflection Density | Abnormal Transfer (High E/ Low E) | Maximum Reflection Density | Abnormal Transfer (High E/ Low E) |
| Comp. Ex. 5-4 | 0.2 | ○ | 2.29 | ○/○ | 2.30 | Δ/Δ |
| Comp. Ex. 5-5 | 0.2 | ○ | 2.16 | Δ/Δ | Not able to be Measured | X/X |
| Comp. Ex. 5-6 | 0.2 | ○ | 2.27 | ○/○ | 2.25 | ΔO/ΔO |
| Comp. Ex. 5-7 | 0.2 | ○ | 2.19 | ○/○ | 2.17 | ○/○ |
| Comp. Ex. 5-8 | 0.2 | ○ | 1.98 | ○/○ | 1.96 | ○/○ |
| Comp. Ex. 5-9 | 0.2 | ○ | 2.53 | | 2.52 | ○/Δ |
| Comp. Ex. 5-10 | 0.2 | ○ | 2.51 | ○/○ | 2.53 | ΔO/○ |

The following (i) to (xi) were confirmed from the results of Table 6.

(i) When the thermal transfer recording mediums of Reference Example, Examples 5-1 to 5-5 and Comparative Examples 5-5 to 5-7 in which the undercoat layer was provided were compared to the thermal transfer recording mediums of Comparative Examples 5-1 and 5-2 in which the undercoat layer was not provided, it was found that the transfer sensitivity during high-speed printing was clearly higher.

(ii) When the thermal transfer recording mediums in which the dye layer contained an anthraquinone-based dye were compared to the thermal transfer recording mediums in which the dye layer contained dyes other than an anthraquinone-based dye (for example, comparison between Reference Example and Comparative Example 5-6, comparison between Example 5-1 and Comparative Example 5-7, and comparison between Comparative Example 5-3 and Comparative Example 5-5), a difference in transfer density was shown. Meanwhile, when the thermal transfer recording medium of Comparative Example 5-8 in which the undercoat layer not containing polyvinyl alcohol was formed was compared to the thermal transfer recording medium of Reference Example in which the undercoat layer containing polyvinyl alcohol was formed, a large difference in the occurrence of abnormal transfer was not shown, but a large difference in transfer density was shown.

It was found from the above result that, in the thermal transfer recording mediums in which the dye layer contained an anthraquinone-based dye, the effect of improving the transfer sensitivity was obtained by the undercoat layer containing polyvinyl alcohol.

(iii) In the thermal transfer recording medium of Comparative Example 5-4 in which a polyvinyl alcohol having a crystallinity degree of 10% was used for the undercoat layer, abnormal transfer was observed after storage in a high-temperature and high-humidity environment. On the other hand, in the thermal transfer recording mediums of Examples 5-1 to 5-3 in which polyvinyl alcohols having crystallinity degrees of 15%, 25%, and 37% were used, respectively, abnormal transfer was not observed after storage in a high-temperature and high-humidity environment. Particularly, in the thermal transfer recording medium of Example 5-3 in which a polyvinyl alcohol having a crystallinity degree of 35% or more was used for the undercoat layer, abnormal transfer was not observed after storage in a high-temperature and high-humidity environment, and superior transfer sensitivity was shown. It was found from the above results that, by controlling the crystallinity degree of a polyvinyl alcohol used for the undercoat layer to be higher than or equal to 15%, the prevention of abnormal transfer after storage in a high-temperature and high-humidity environment was greatly improved. Likewise, in the thermal transfer recording medium of Comparative Example 5-3 in which a polyvinyl alcohol having a crystallinity degree of 10% was used for the undercoat layer, abnormal transfer after storage in a high-temperature and high-humidity environment was observed. However, in the thermal transfer recording medium of Reference Example in which a polyvinyl alcohol having a crystallinity degree of 25% was used for the undercoat layer, it was found that, abnormal transfer after storage in a high-temperature and high-humidity environment was observed to a small degree but was greatly improved.

(iv) When the thermal transfer recording medium of Reference Example was compared to the thermal transfer recording medium of Example 5-1, it was found that abnormal transfer after storage in a high-temperature and high-humidity environment was suppressed in Example 5-1. The reason is presumed to be that, in the presence of polyvinyl pyrrolidone, the adhesion after storage in a high-temperature and high-humidity environment was improved.

(v) When the thermal transfer recording medium of Example 5-4 was compared to the thermal transfer recording medium of Example 5-1, it was found that the adhesion after storage in a high-temperature and high-humidity was decreased to some extent because the coating amount of the undercoat layer was less than 0.05 g/m².

(vi) When the thermal transfer recording medium of Example 5-5 was also compared to the thermal transfer recording medium of Example 5-1, it was found that the effect of improving the transfer sensitivity was decreased because the coating amount of the undercoat layer was greater than 0.30 g/m².

(vii) When the thermal transfer recording medium of Example 5-6 was compared to the thermal transfer recording medium of Example 5-1, it was found that abnormal transfer occurred to a small degree on an image printed with low energy using the product stored at room temperature because the content ratio of the release agent in the dye layer to the binder in the dye layer was less than 0.5 mass %.

(viii) When the thermal transfer recording medium of Example 5-7 was also compared to the thermal transfer recording medium of Example 5-1, it was found that the transfer sensitivity was decreased because the content ratio of the release agent in the dye layer to the binder in the dye layer was greater than 2.0 mass %.

(ix) When the thermal transfer recording medium of Comparative Example 5-9 was compared to the thermal transfer recording medium of Example 5-1, it was found that abnormal transfer was observed during low-energy printing because only the non-reactive silicone oil (molecular weight: 10,000) having side chains modified with a polyether was contained therein.

(x) When the thermal transfer recording medium of Comparative Example 5-10 was also compared to the thermal transfer recording medium of Example 5-1, it was found that abnormal transfer was observed to a small degree during high-energy printing because only the reactive silicone oil (molecular weight: 3,000) having both terminals modified with an amino was contained therein.

(xi) When Reference Example was compared to Comparative Example 5-1, it was found that, by providing the undercoat layer, the transfer density was increased. As described above, even when the amount of a dye used in the dye layer is small, the same level of density as that of a case where the undercoat layer is not formed can be obtained. Therefore, it is considered that the thermal transfer recording medium according to the fifth embodiment has a cost-reduction effect.

As described above, in the thermal transfer recording medium according to the fifth embodiment, the undercoat layer 20 contains a polyvinyl pyrrolidone and a polyvinyl alcohol having a crystallinity degree of 15% or higher as major components, the dye layer contains an anthraquinone-based thermal transfer dye and a release agent containing at least two modified silicone oils, one of the modified silicone oils in the release agent is a non-reactive silicone oil having a molecular weight of 8,000 or higher and having side chains modified with a polyether, and the other one of the modified silicone oils in the release agent is a reactive silicone oil having a molecular weight of 5,000 or lower and having both terminals modified with an amino. Therefore, it is possible to provide a thermal transfer recording medium capable of obtaining high transfer sensitivity during high-speed printing, that is, obtaining a high-density image without increasing the amount of a dye used in a dye layer; and preventing abnormal transfer during printing even when an image is formed by thermal transfer using a thermal transfer image-receiving sheet on which a water-based receiving layer is formed after storage in a high-temperature and high-humidity environment.

Therefore, in the thermal transfer recording medium according to the fifth embodiment, the transfer sensitivity during high-speed printing is low. As a result, it is possible to solve the problem that the amount of a dye used in a dye layer cannot be decreased. In addition, it is possible to solve the problem that abnormal transfer occurs during printing after storage in a high-temperature and high-humidity environment. Further, it is possible to solve the problem that abnormal transfer occurs during printing when an image is formed by thermal transfer using a thermal transfer image-receiving sheet on which a water-based receiving layer is formed.

INDUSTRIAL APPLICABILITY

The thermal transfer recording medium according to the present invention can be used in a sublimation thermal transfer type printer and can simply form various full-color images in combination with high-speed and high-performance printers. Therefore, the thermal transfer recording medium according to the present invention can be widely used for self-printing of digital camera photos and for printing cards such as ID cards, printed materials for fun, and the like.

REFERENCE SIGNS LIST

1: thermal transfer recording medium
10: substrate
20: undercoat layer
30: dye layer
40: heat-resistant sliding layer

The invention claimed is:

1. A thermal transfer recording medium comprising:
  a heat-resistant sliding layer formed on one surface of a substrate; and
  an undercoat layer and a dye layer sequentially laminated on the other surface of the substrate,
  wherein the undercoat layer comprises, as major components, a polyvinyl pyrrolidone and a polyvinyl alcohol having a crystallinity degree of 15% or higher, the crystal degree being calculated by thermal analysis, and
  the dye layer comprises an anthraquinone-based thermal transfer dye.

2. The thermal transfer recording medium according to claim 1, wherein
  a coating amount of the undercoat layer after drying is in a range of 0.05 g/m$^2$ to 0.30 g/m$^2$.

3. The thermal transfer recording medium according to claim 2, wherein
  the dye layer further comprises a polyvinyl acetal resin having a glass transition temperature of 100° C. or higher and a polyvinyl butyral resin having a glass transition temperature of 75° C. or lower.

4. The thermal transfer recording medium according to claim 3, wherein
  a mass content ratio of the polyvinyl acetal resin to the polyvinyl butyral resin, defined as (a content of the polyvinyl acetal resin)/(a content of the polyvinyl butyral resin) is in a range of 97/3 to 50/50.

5. The thermal transfer recording medium according to claim 2, wherein
  an average value of a surface roughness Ra of the heat-resistant sliding layer before being left to stand in an environment of 150° C. is in a range of 0.05 to 0.50,
  an average value of a surface roughness Ra of the heat-resistant sliding layer after being left to stand in an environment of 150° C. for 10 minutes is in a range of 0.00 to 0.80, and
  an absolute value of a difference between the average values of the surface roughnesses Ra of the heat-resistant sliding layer before and after being left to stand in an environment of 150° C. for 10 minutes is in a range of 0.00 to 0.30.

6. The thermal transfer recording medium according to claim 5, wherein
  the heat-resistant sliding layer comprises inorganic particles.

7. The thermal transfer recording medium according to claim 2, wherein
  the thermal transfer recording medium is a thermal transfer recording medium for forming an image by thermal transfer on a thermal transfer image-receiving sheet in which a water-based receiving layer is formed on a sheet with a water-based hollow particle layer interposed therebetween,
  the water-based receiving layer comprises a water-based binder and a release agent,
  the water-based hollow particle layer comprises a water-based binder and hollow particles,
  the dye layer further comprises filler particles, and
  a three-dimensional surface roughness SRa of the dye layer is in a range of 0.15 μm to 0.70 μm.

8. The thermal transfer recording medium according to claim 7, wherein
a volume average particle size of the filler particles is greater than 0.1 μm and less than 3.0 μm.

9. The thermal transfer recording medium according to claim 2, wherein
the thermal transfer recording medium is a thermal transfer recording medium for forming an image by thermal transfer on a thermal transfer image-receiving sheet in which a water-based receiving layer is formed on a sheet with a water-based hollow particle layer interposed therebetween,
the water-based receiving layer comprises a water-based binder and a release agent,
the water-based hollow particle layer comprises a water-based binder and hollow particles,
the dye layer further comprises a release agent containing at least two modified silicone oils,
one of the modified silicone oils in the release agent is a non-reactive silicone oil having a molecular weight of 8,000 or higher and having side chains modified with a polyether, and
the other one of the modified silicone oils in the release agent is a reactive silicone oil having a molecular weight of 5,000 or lower and having both terminals modified with an amino.

10. The thermal transfer recording medium according to claim 9, wherein
the dye layer further comprises a binder, and
a content ratio of the release agent in the dye layer to the binder in the dye layer is in a range of 0.5 mass % to 2.0 mass %.

11. The thermal transfer recording medium according to claim 10, wherein
a crystallinity degree of the polyvinyl alcohol contained in the undercoat layer is higher than or equal to 35%.

12. The thermal transfer recording medium according to claim 9, wherein
a crystallinity degree of the polyvinyl alcohol contained in the undercoat layer is higher than or equal to 35%.

13. The thermal transfer recording medium according to claim 1, wherein
the dye layer further comprises a polyvinyl acetal resin having a glass transition temperature of 100° C. or higher and a polyvinyl butyral resin having a glass transition temperature of 75° C. or lower.

14. The thermal transfer recording medium according to claim 13, wherein
a mass content ratio of the polyvinyl acetal resin to the polyvinyl butyral resin, defined as (a content of the polyvinyl acetal resin)/(a content of the polyvinyl butyral resin) is in a range of 97/3 to 50/50.

15. The thermal transfer recording medium according to claim 1, wherein
an average value of a surface roughness Ra of the heat-resistant sliding layer before being left to stand in an environment of 150° C. is in a range of 0.05 to 0.50,
an average value of a surface roughness Ra of the heat-resistant sliding layer after being left to stand in an environment of 150° C. for 10 minutes is in a range of 0.00 to 0.80, and
an absolute value of a difference between the average values of the surface roughnesses Ra of the heat-resistant sliding layer before and after being left to stand in an environment of 150° C. for 10 minutes is in a range of 0.00 to 0.30.

16. The thermal transfer recording medium according to claim 15, wherein
the heat-resistant sliding layer comprises inorganic particles.

17. The thermal transfer recording medium according to claim 1, wherein
the thermal transfer recording medium is a thermal transfer recording medium for forming an image by thermal transfer on a thermal transfer image-receiving sheet in which a water-based receiving layer is formed on a sheet with a water-based hollow particle layer interposed therebetween,
the water-based receiving layer comprises a water-based binder and a release agent,
the water-based hollow particle layer comprises a water-based binder and hollow particles,
the dye layer further comprises filler particles, and
a three-dimensional surface roughness SRa of the dye layer is in a range of 0.15 μm to 0.70 μm.

18. The thermal transfer recording medium according to claim 17, wherein
a volume average particle size of the filler particles is greater than 0.1 μm and less than 3.0 μm.

19. The thermal transfer recording medium according to claim 1, wherein
the thermal transfer recording medium is a thermal transfer recording medium for forming an image by thermal transfer on a thermal transfer image-receiving sheet in which a water-based receiving layer is formed on a sheet with a water-based hollow particle layer interposed therebetween,
the water-based receiving layer comprises a water-based binder and a release agent,
the water-based hollow particle layer comprises a water-based binder and hollow particles,
the dye layer further comprises a release agent containing at least two modified silicone oils,
one of the modified silicone oils in the release agent is a non-reactive silicone oil having a molecular weight of 8,000 or higher and having side chains modified with a polyether, and
the other one of the modified silicone oils in the release agent is a reactive silicone oil having a molecular weight of 5,000 or lower and having both terminals modified with an amino.

20. The thermal transfer recording medium according to claim 19, wherein
the dye layer further comprises a binder, and
a content ratio of the release agent in the dye layer to the binder in the dye layer is in a range of 0.5 mass % to 2.0 mass %.

21. The thermal transfer recording medium according to claim 19, wherein
a crystallinity degree of the polyvinyl alcohol contained in the undercoat layer is higher than or equal to 35%.

* * * * *